United States Patent
Ye et al.

(10) Patent No.: US 12,504,515 B2
(45) Date of Patent: Dec. 23, 2025

(54) LIDAR

(71) Applicant: SUTENG INNOVATION TECHNOLOGY CO., LTD., Shenzhen (CN)

(72) Inventors: Gaoshan Ye, Shenzhen (CN); Lei Deng, Shenzhen (CN)

(73) Assignee: SUTENG INNOVATION TECHNOLOGY CO., LTD., Shenzhen (CN)

( * ) Notice: Subject to any disclaimer, the term of this patent is extended or adjusted under 35 U.S.C. 154(b) by 944 days.

(21) Appl. No.: 17/704,045

(22) Filed: Mar. 25, 2022

(65) Prior Publication Data

US 2022/0229158 A1 Jul. 21, 2022

Related U.S. Application Data

(63) Continuation of application No. PCT/CN2020/117266, filed on Sep. 24, 2020.

(30) Foreign Application Priority Data

Sep. 25, 2019 (CN) .......................... 201910912316.0
Sep. 25, 2019 (CN) .......................... 201910913604.8
(Continued)

(51) Int. Cl.
*G01S 7/481* (2006.01)
*G01S 7/48* (2006.01)

(52) U.S. Cl.
CPC .......... *G01S 7/4813* (2013.01); *G01S 7/4804* (2013.01)

(58) Field of Classification Search
CPC ..... G01S 7/4804; G01S 7/4813; G01S 7/4817
See application file for complete search history.

(56) References Cited

U.S. PATENT DOCUMENTS

| | | | | |
|---|---|---|---|---|
| 10,338,199 B1* | 7/2019 | McWhirter | ........... | G01S 7/4816 |
| 10,429,495 B1* | 10/2019 | Wang | .................... | G01S 7/4815 |
| 2020/0132851 A1* | 4/2020 | Gassend | .............. | G01S 7/4817 |

FOREIGN PATENT DOCUMENTS

| | | |
|---|---|---|
| CN | 108508431 A | 9/2018 |
| CN | 108828558 A | 11/2018 |
| (Continued) | | |

OTHER PUBLICATIONS

First Office Action issued in related Chinese Application No. 201910913604.8, mailed Apr. 1, 2021, 8 pages.

*Primary Examiner* — Hina F Ayub
(74) *Attorney, Agent, or Firm* — BAYES PLLC

(57) ABSTRACT

The present application provides a LiDAR. A baffle fixing structure of the LiDAR is set between an inner housing of the LiDAR and a second housing for fixing a baffle that isolates an emitting laser from a reflected device. An angular displacement measuring device of the LiDAR includes a reflecting part and a light emitting part, wherein the reflecting part includes a plurality of reflecting teeth that extend downwardly and are spaced from each other, the light emitting part obtains a rotation angle of the reflecting part relative to the light emitting part by obtaining the number of the reflecting teeth passed by the measurement light. A rotating system in the LiDAR is arranged on one side of the laser transceiver system and is detachably connected to the laser transceiver system, so that modular production can be carried out, and the production efficiency is improved.

7 Claims, 20 Drawing Sheets

(30) Foreign Application Priority Data

Sep. 25, 2019 (WO) ................ PCT/CN2019/107846
Nov. 1, 2019 (WO) ................ PCT/CN2019/115026

(56) References Cited

FOREIGN PATENT DOCUMENTS

| | | |
|---|---|---|
| CN | 109581328 A | 4/2019 |
| CN | 208766302 U | 4/2019 |
| CN | 110231608 A | 9/2019 |
| DE | 19636626 C2 | 9/1998 |
| EP | 3179272 A1 | 6/2017 |

* cited by examiner

LIDAR

CROSS-REFERENCE TO RELATED APPLICATION

The present application is a continuation of International Application No. PCT/CN2020/117266, filed Sep. 24, 2020, which claims the benefit of priority to International Application No. PCT/CN2019/107846, filed Sep. 25, 2019, China Patent Application No. CN201910912316.0, filed Sep. 25, 2019, China Patent Application No. CN201910913604.8, filed Sep. 25, 2019, and International Application No. PCT/CN2019/115026, filed Nov. 1, 2019, the contents of which are incorporated herein by reference in their entireties.

TECHNICAL FIELD

The present application relates to the technical field of laser detection, and in particular to a LiDAR.

BACKGROUND

Light detection and ranging (LiDAR) is a radar system that emits a laser beam to detect the position, speed and other characteristics of an object, its working principle is that a transmitting system first emits an emitted laser to the detection area, and then a receiving system receives the reflected laser reflected back from the object in the detection area, compares the reflected laser with the emitted laser, and after processing, obtains information about the object, such as distance, orientation, height, speed, posture and even shape and other parameters.

In order to obtain a larger working range, the LiDAR in the existing technology usually includes a rotating system, which drives a transceiver system to rotate relative to a base so as to obtain a larger field of view. The rotating system in the traditional technology generally includes a housing and a base connected to a lower end of the housing. The base has a positioning column extending upwards, which occupies the central space in the housing. In order to allow the laser generated by a laser transmitting device to be successfully emitted from the housing, certain optical elements need to be provided in the housing to adjust the path of the laser so that the laser in the housing can avoid the positioning column. However, such a structure makes the LiDAR have a complex structure and high production costs. Moreover, the transceiver device of the LiDAR is typically arranged inside the housing, which makes the assembly complicated and further and the disassembly inconvenient.

It is therefore necessary to provide a LiDAR without the above technical problems.

BRIEF SUMMARY

The present application provides a LiDAR.

According to a first aspect, the present application provides a LiDAR, including a laser transceiver system and a rotating system. The laser transceiver system is configured to emit an emitted laser and receive a reflected laser, the reflected laser is the laser reflected back by the object in the detection area; and the rotating system is disposed on one side of the laser transceiver system, and is detachably connected to the laser transceiver system. The rotating system may drive the laser transceiver system to rotate so as to change the path of the emitted laser.

According to a second aspect, the present application further provides a baffle fixing structure for a LiDAR. The LiDAR includes a transmitting device and a receiving device, the transmitting device is used to emit an emitted laser, the receiving device is used to receive a reflected laser reflected back by the object in the detection area, the baffle fixing structure includes an inner housing, an outer housing, and a baffle, and the transmitting device and the receiving device are all disposed in the inner housing, wherein the outer housing is sleeved outside the inner housing and spaced apart from the inner housing; the baffle includes a first isolation portion and a second isolation portion, the first isolation portion is disposed in the inner housing and isolates the transmitting device and the receiving device; and the second isolation portion extends along the edge of the first isolation portion and to the space between the inner housing and the outer housing, and is used to isolate the emitted laser and the reflected laser between the outer housing and the inner housing.

According to a third aspect, the present application further provides a LiDAR, which includes the baffle fixing structure provided by the second aspect of the present application, and a laser transceiver system. The laser transceiver system includes a transmitting device and a receiving device.

According to a fourth aspect, the present application further provides a bearing mounting structure used for a LiDAR, including a rotating body, a first housing and a bearing. The rotating body includes a driving body and a shaft body, the driving body is configured to provide driving force, the shaft body is connected to the driving body, and configured to transmit torque to an external element, and the diameter of the shaft body is smaller than the diameter of the driving body. The first housing defines an internal chamber, the rotating body is disposed in the internal chamber, and the fixing structure is disposed in the internal chamber. The bearing includes an inner ring body and an outer ring body, the inner ring body is sleeved on the outer peripheral wall of the driving body, and the outer ring body surrounds the inner ring body, and is connected to the fixing structure, so that the rotating body may rotate relative to the fixing structure while being carried by the fixing structure.

According to a fifth aspect, the present application further provides a LiDAR, including a laser transceiver system, a rotating system, and the bearing mounting structure set forth in the fourth aspect of the present application. The laser transceiver system is configured to emit an emitted laser and receive a reflected laser, and the reflected laser is the laser reflected back by the object in the detection area. The rotating system is disposed on one side of the laser transceiver system, and is detachably connected to the laser transceiver system, and the rotating system is configured to drive the laser transceiver system to rotate to change the path of the laser transceiver system and the reflected laser.

According to a sixth aspect, the present application further provides an angular displacement measurement device for the LiDAR. The angular displacement measurement device includes a base and a rotating body that rotates relative to the base, and the rotating body includes a peripheral wall that arranged around its own central axis and an end wall that located at one end of the peripheral wall and close to the base. The angular displacement measurement device includes a reflecting part and a light emitting part, the reflecting part is connected to the end wall, and includes a plurality of reflecting tooth extending toward the base and spaced from each other, each reflecting tooth is disposed in a common arc, and the arc extends around the central axis. The light emitting part may be connected to the base. When it works, it may emit and receive measurement light, the path of the measurement light is perpendicular to the central axis.

When the reflecting part follows the rotating body and rotates relative to the base, the light emitting part may obtain the angle of rotation of the reflecting part relative to the light emitting part by obtaining a quantity of the reflecting teeth that the measurement light sweeps.

According to a seventh aspect, the present application further provides a LiDAR, which includes a base, a rotating body, and the angular displacement measurement device that is connected to the base, and configured to rotate relative to the base as set forth in the sixth aspect.

The present application further provides an angle adjustment method for the LiDAR in the seventh aspect, which includes: controlling the rotating body to rotate to an initial position relative to the base; obtaining a rotation angle and a rotation direction of the rotating body from the initial position to a working position; and controlling the rotating body to rotate to the working position according to the rotation angle and the rotation direction.

The LiDAR provided in the present application includes a laser transceiver system and a rotating system, and the laser transceiver system includes a transmitting device that may emit an emitted laser and a receiving device that may receive a reflected laser. The rotating system is disposed on one side of the laser transceiver system and is detachably connected to the laser transceiver system. The LiDAR provided in the present application separates the optical path part (that is, the laser transceiver system) from the driving part (that is, the rotating system), so that the two become two relatively independent parts. On the one hand, the path of the laser emitted by the transmitting device and the laser received by the receiving device in the laser transceiver system does not need to avoid other structures (in the prior art, it is necessary to avoid the positioning column at the center), so the structure of the laser transceiver system is simple and inexpensive. On the other hand, due to the fact that in the present application, the laser transceiver system is detachably connected to the rotating system, the two are relatively independent of each other when they are not connected, so the manufacturing processes of the two may also be independent, and both may be manufactured through a modular production process at the same time, thereby greatly increasing efficiency of production of the LiDAR.

The baffle fixing structure for the LiDAR provided in the present application includes an inner housing, a baffle and an outer housing. A transmitting device and a receiving device are provided in the inner housing, the transmitting device is configured to emit an emitted laser, and the receiving device is configured to receive a reflected laser. The baffle penetrates the inner housing, and includes a first isolation portion in the inner housing and a second isolation portion between the inner housing and the outer housing. The first isolation portion of the baffle is configured to isolate the emitted laser from the receiving laser, and the second isolation portion of the baffle is configured to isolate the emitted laser from the reflected laser between the outer housing and the inner housing. The foregoing structure not only avoids laser interference in the housing, but also avoids laser interference between the inner housing and the second housing, thereby improving the isolation effect between the emitted laser and the receiving laser of the LiDAR.

The bearing mounting structure provided in the present application includes a rotating body, the rotating body includes a driving body and a shaft body, and the shaft body is connected to a laser transceiver system of the LiDAR, and configured to transmit a torque to the LiDAR. In the present application, an inner ring body of a bearing is connected to an outer peripheral wall of the driving body of the rotating body. Compared to the structure that connects the bearing to the shaft body of the rotating body, the length of the rotating body may be reduced, thereby reducing the overall length dimension of the LiDAR. At the same time, since the length of the rotating body is reduced, the deflection of the rotating body when subjected to a bending moment is reduced, and the structural stability is thereof improved.

The angular displacement measurement device provided in the present application includes a reflecting part and a light emitting part. The reflecting part is connected to an end wall of the rotating body, and includes a plurality of reflecting teeth spaced from each other, and each reflecting tooth extends toward the direction of a base. The path of a measurement light emitted by the light emitting part is perpendicular to a central axis. When the reflecting part rotates with the rotating body relative to the base, the light emitting part may obtain the angle of rotation of the reflecting part relative to the light emitting part by obtaining a quantity of the reflecting teeth swept by the measurement light. Since one of the two parts of the angular displacement measurement device is disposed on the rotating body and the other one is disposed on the base, the assembly between the light emitting part and the reflecting part may be completed through the assembly of the base and the rotating body, thereby reducing the assembly process between the two parts of the light emitting part and the reflecting part, and improving the assembly efficiency. At the same time, since the reflecting teeth extend toward the direction of the base, dirt can hardly accumulate in the gap between two adjacent teeth, so the problem of low accuracy caused by dirt accumulation on the disc in the existing technology can be solved.

DETAILED DESCRIPTION

Figure 1:
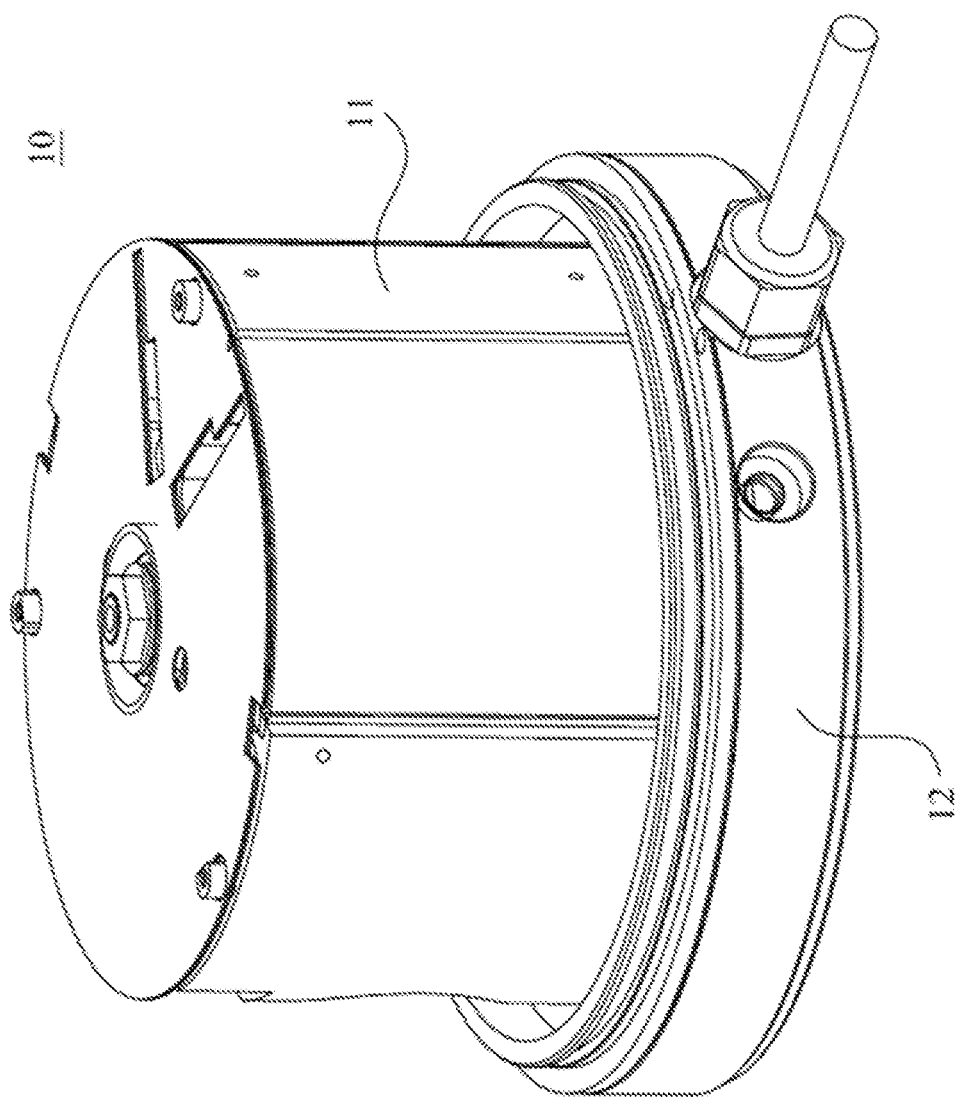
FIG. 1 is a perspective schematic diagram of a LiDAR provided in accordance with an embodiment of the present application.
Figure 2:
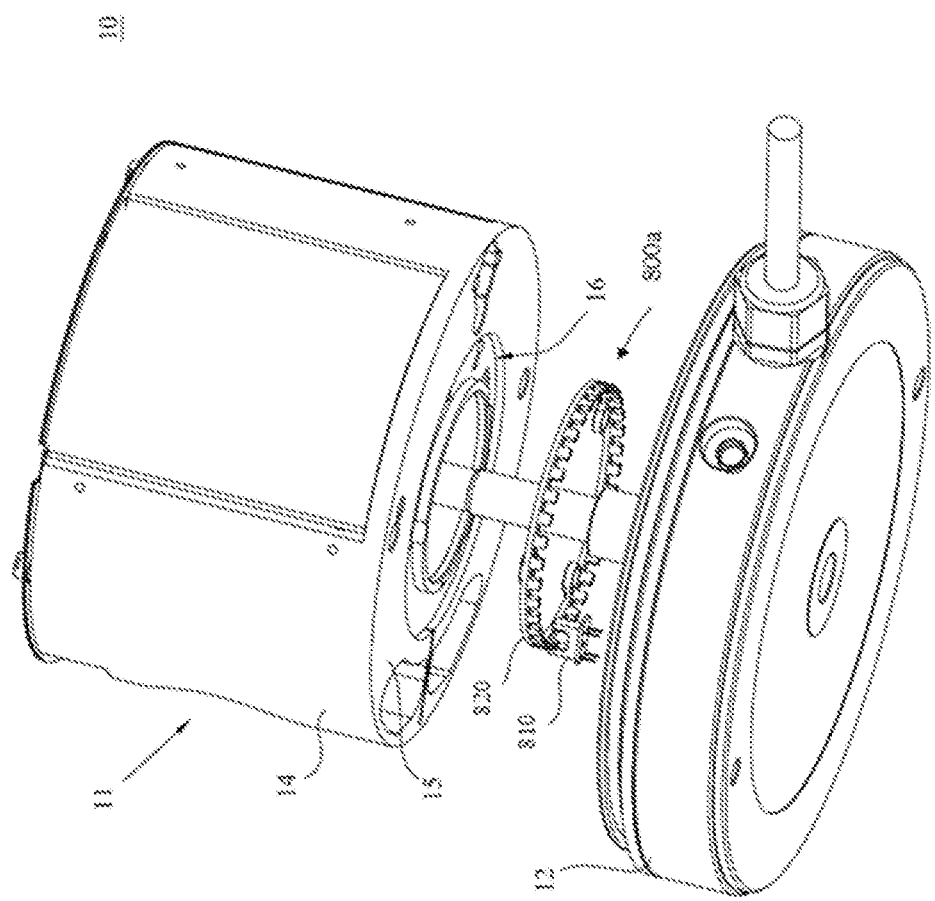
FIG. 2 is a first exploded schematic diagram of a LiDAR provided in accordance with an embodiment of the present application.
Figure 3:
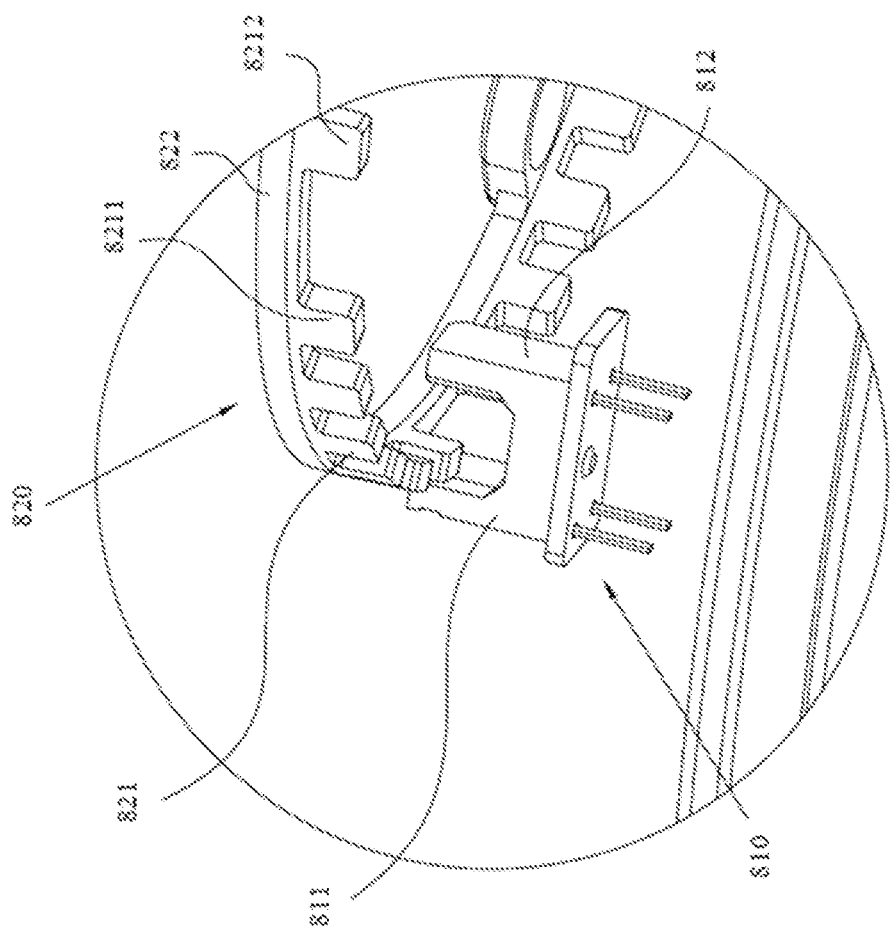
FIG. 3 is a partial enlarged diagram of FIG. 2.
Figure 4:
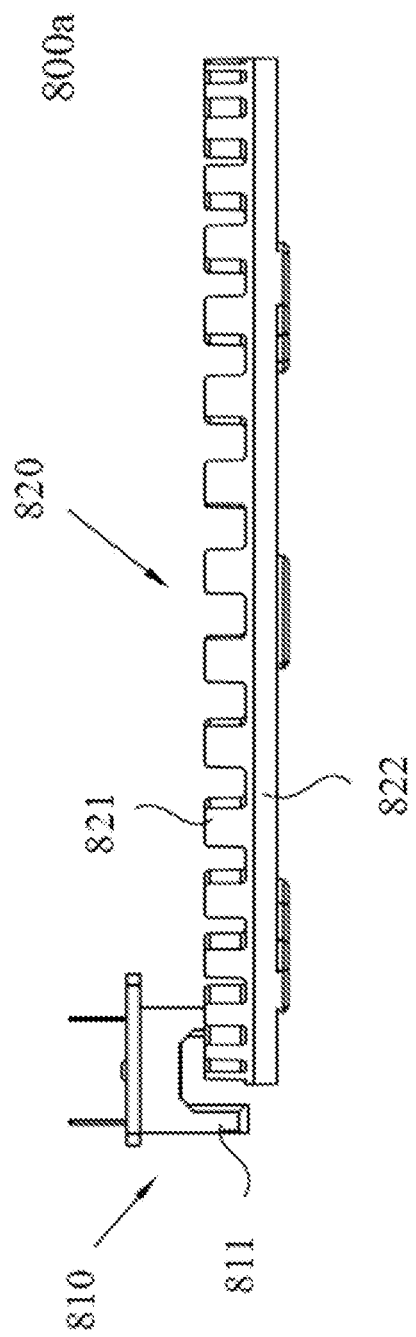
FIG. 4 is a front view diagram of an angular displacement measurement device provided in accordance with an embodiment of the present application.
Figure 5:
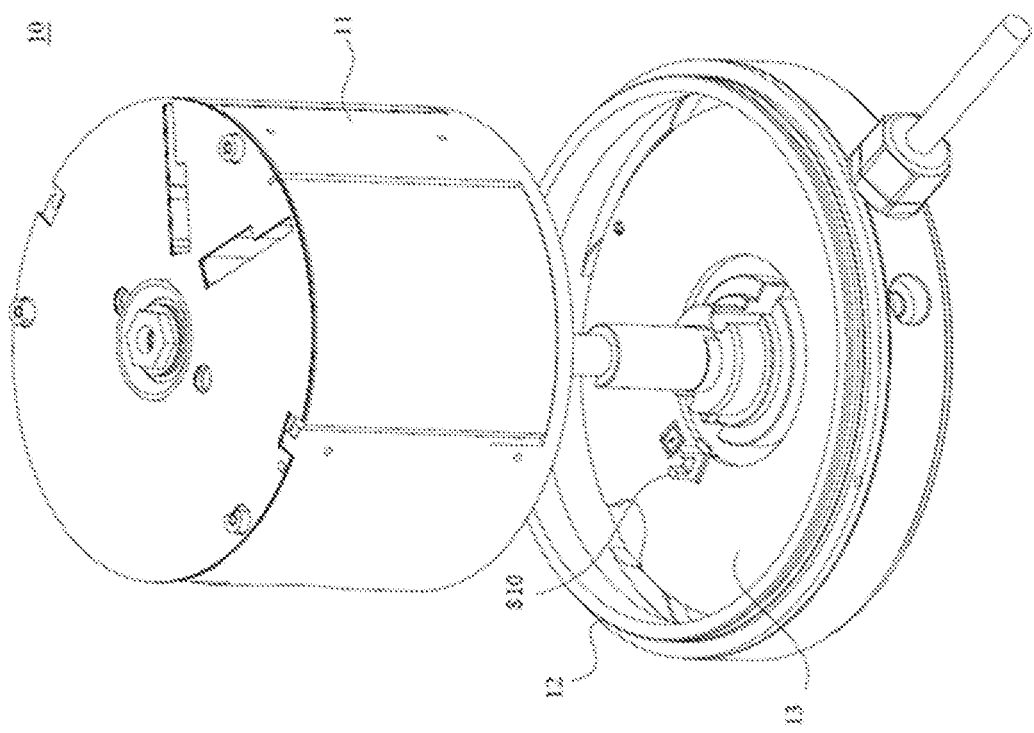
FIG. 5 is a second exploded schematic diagram of a LiDAR provided in accordance with an embodiment of the present application.
Figure 6:
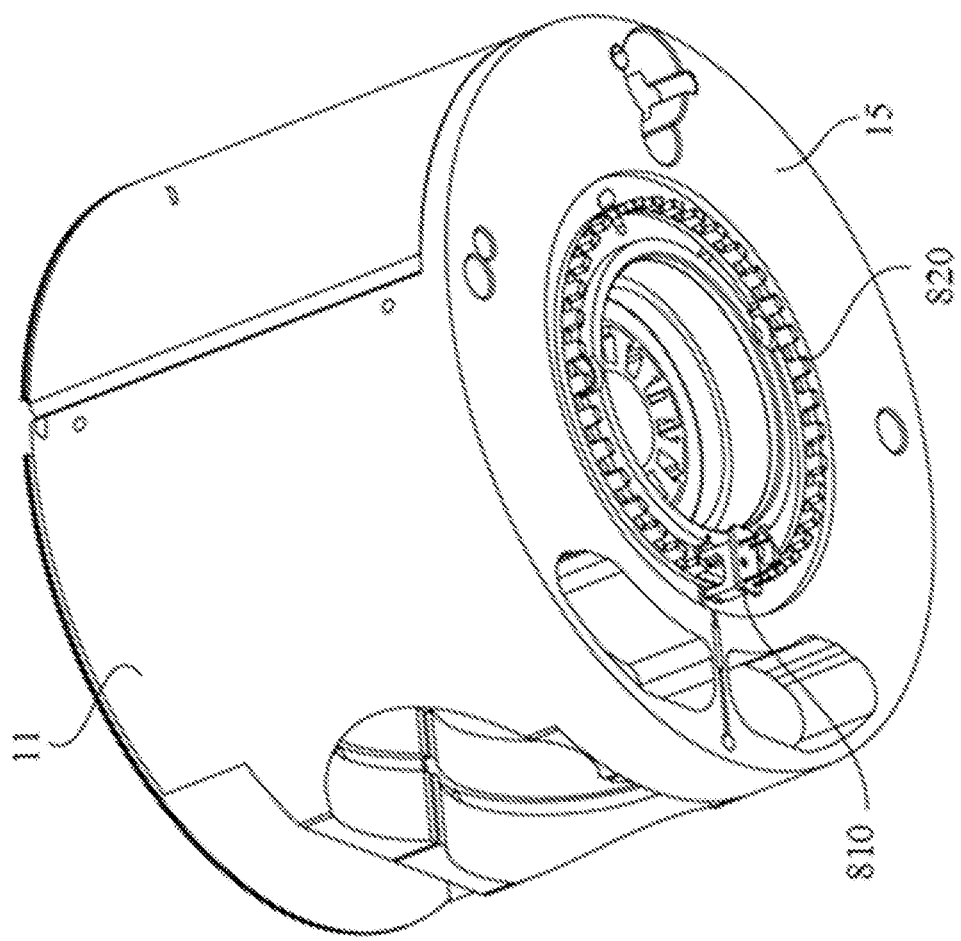
FIG. 6 is a perspective schematic diagram of a rotating body assembled with an angular displacement measurement device provided in accordance with an embodiment of the present application.

The following description provides specific scenarios and requirements of the present application for the purpose of enabling those skilled in the art to make and use the contents of the present application. Various sectional modifications to the disclosed embodiments are obvious to those skilled in the art, and the general principles defined herein may be applied to other embodiments and applications without departing from the spirit and scope of the present disclosure. Therefore, the present disclosure is not limited to the embodiments shown, but is consistent with the broadest scope of the claims.

The terminology used herein is for the purpose of describing particular exemplary embodiments only and is not intended to be limiting. As used herein, the singular forms "a," "an" and "the" may include their plural forms as well, unless the context clearly indicates otherwise. When used in this disclosure, the terms "comprises," "comprising," "includes" and/or "including" refer to the presence of stated features, integers, steps, operations, elements, and/or components, but do not preclude the presence or addition of one or more other features, integers, steps, operations, elements, components, and/or groups thereof. As used in this disclosure, the term "A on B" means that A is directly adjacent to B (from above or below), and may also mean that A is indirectly adjacent to B (i.e., there is some element between A and B); the term "A in B" means that A is all in B, or it may also mean that A is partially in B.

In view of the following description, these and other features of the present disclosure, as well as operations and functions of related elements of the structure, and the economic efficiency of the combination and manufacture of the components, may be significantly improved. All of these form part of the present disclosure with reference to the drawings. However, it should be clearly understood that the drawings are only for the purpose of illustration and description, and are not intended to limit the scope of the present disclosure.

The following description can significantly improve these and other features of the present disclosure, the operation and function of related elements of the structure, as well as the economic efficiency of assembly and manufacturing of the components. It is also understood that the drawings are not drawn to scale.

Light detection and ranging (LiDAR) is a radar system that emits a laser beam to detect the position, speed and other characteristics of an object. Its working principle is that a transmitting device first emits an emitted laser to the detection area, and then a receiving device receives a reflected laser that is reflected back from the object in the detection area, compares the reflected laser with the emitted laser, and after processing, obtains information about the object, such as distance, orientation, height, speed, posture, and even shape and other parameters.

An existing mechanical LiDAR includes a rotating body and a base. The rotating body may rotate relative to the base. A laser transmitting device and a laser receiving device are disposed in the rotating body. Because the rotating body rotates relative to the base, a path of an emitted laser generated by the laser transmitting device is changed, and a purpose of detecting objects in different areas is achieved. In order to accurately detect a predetermined area, precise control of the angle of rotation of the rotating body is needed. In the prior art, an angular displacement measurement device is provided within the LiDAR to measure the angle of rotation of the rotating body relative to the base. A control center of the LiDAR controls the rotation of the rotating body by obtaining the measured value obtained by the angular displacement measurement device. The angular displacement measurement device in the prior art includes a reflective disc and an encoder, but the reflective disc has high environmental requirements, and many accumulate dirt over time, resulting in inaccurate measurements.

Figure 7:
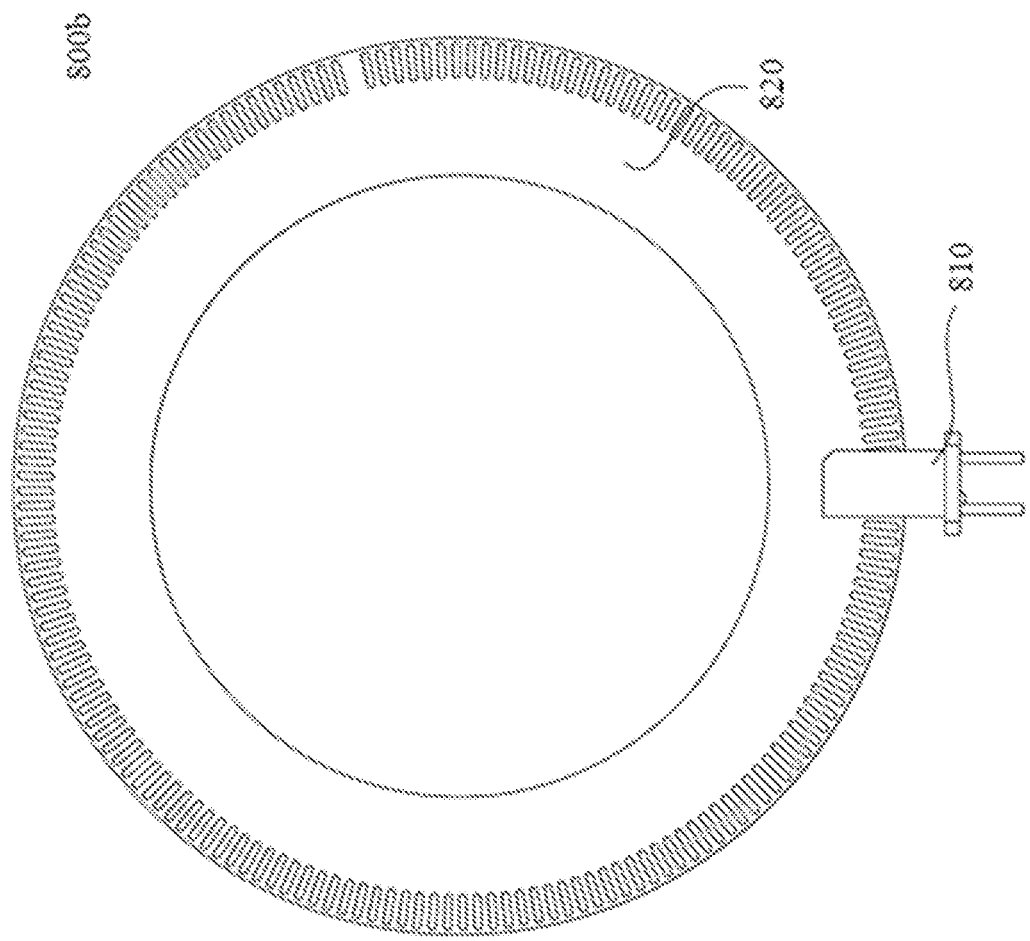
FIG. 7 is a top view diagram of an alternative angular displacement measurement device provided in accordance with an embodiment of the present application.
Figure 8:
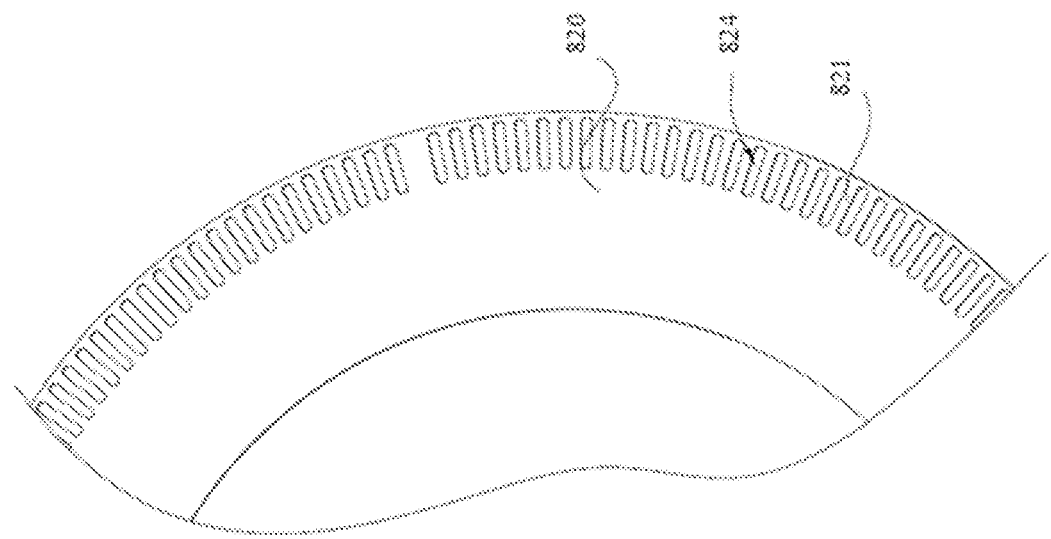
FIG. 8 is a partial enlarged diagram of FIG. 7.
Figure 9:
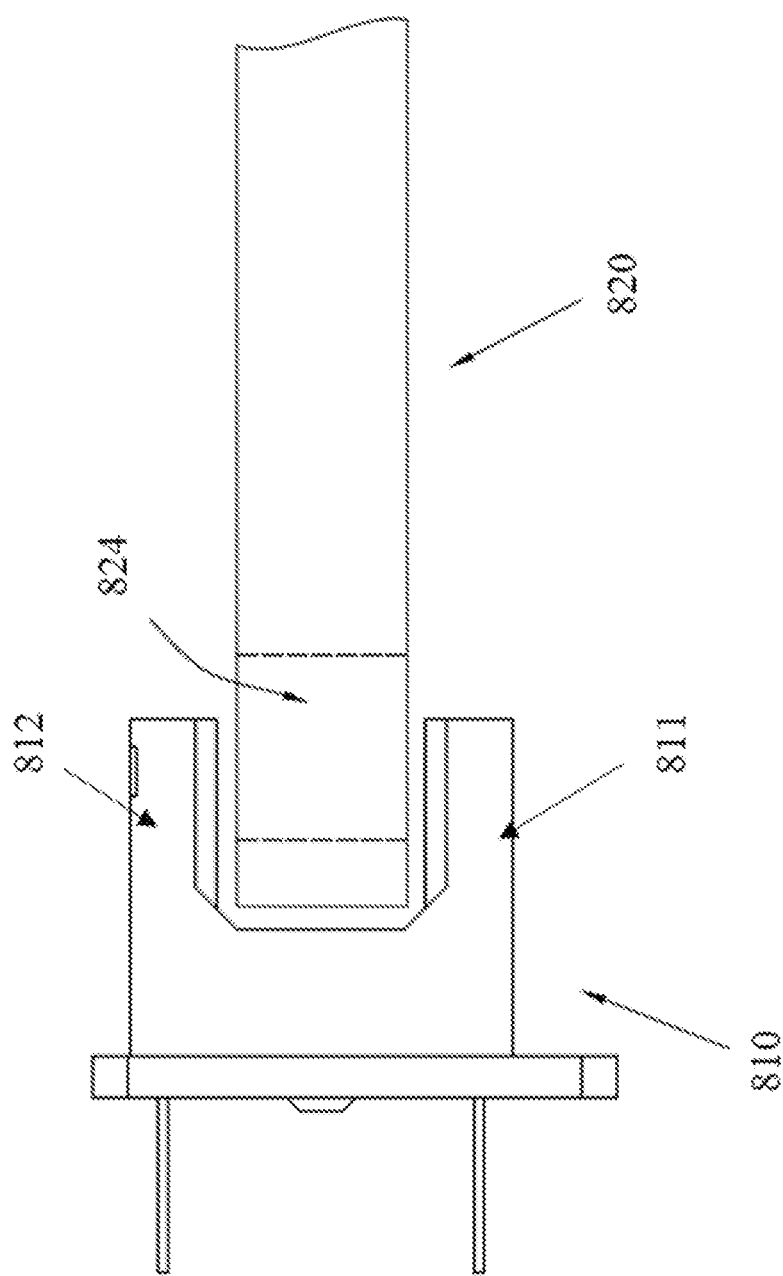
FIG. 9 is a top view diagram of an alternative angular displacement measurement device provided in accordance with an embodiment of the present application.

Therefore, the present application provides an angular displacement measurement device for a LiDAR. FIGS. 1 to 9 show an angular displacement measurement device 800a for a LiDAR 10 according to some embodiments of the present application. The LiDAR 10 may include a base 12 and a rotating body 11 that may rotate relative to the base 12. FIGS. 2 to 6 show an angular displacement measurement device 800a for the LiDAR 10 provided according to an embodiment of the present application. FIGS. 7 to 9 show another angular displacement measurement device 800b for the LiDAR 10 provided according to an embodiment of the present application. The angular displacement measurement device 800 may be the angular displacement measurement device 800a or the angular displacement measurement device 800b.

As shown in FIG. 1, the rotating body 11 may rotate relative to the base 12. A transmitting device and a receiving device (not shown in FIG. 1) may be disposed in the rotating body 11. Because the rotating body 11 rotates relative to the base 12, a path of an emitted laser emitted by the transmitting device may be changed, and a purpose of detecting objects in different areas is achieved. Certainly, the transmitting device and the receiving device may also be disposed at other positions of the rotating body 11, for example, on one side of the rotating body 11, and are detachably connected to the rotating body 11. The specific installation positions of the transmitting device and the receiving device are not limited herein. For ease of demonstration, the transmitting device and the receiving device are described in an example in which they are arranged inside the rotating body 11.

The rotating body 11 may include a peripheral wall 14 and an end wall 15. The peripheral wall 14 is arranged around its own rotating axis. The end wall 15 may be located at one end of the peripheral wall 14 and close to the base 12. When the rotating body 11 has a cylindrical shape, the wall surface of the peripheral wall 14 may have a cylindrical surface, and the rotating axis thereof is the central axis of the cylindrical surface. In such a case, the wall surface of the end wall 15 is circular.

In this embodiment, the angular displacement measurement device 800 may include a reflecting part 820 and a light emitting part 810. Angular displacement information may be transmitted by cooperation between the light emitting part 810 and the reflecting part 820. The reflecting part 820 may be connected to the end wall 15. The reflecting part 820 may include a plurality of reflecting teeth 821 extending toward the base 12 and spaced from each other. The reflecting teeth 821 are arranged on a common arc, and the arc extends around the rotating axis. The sentence "the reflecting teeth 821 are arranged on a common arc" indicates that there is an arc segment that can pass through all the reflecting teeth 821 in sequence. For ease of expression, the "arc" in the following refers to the arc segment passing through the reflecting teeth 821 (specifically, it may pass through the centroid of each reflecting tooth 821). The arc segment may have a start point and an end point, and the start point and the end point are provided with a reflecting tooth 821. Each reflecting tooth 821 is arranged on a common arc, and each reflecting tooth 821 is arranged around the rotating axis of the rotating body 11.

The light emitting part 810 may be connected to the base 12, and configured to emit and receive a measurement light. The measurement light may specifically be laser, infrared, ultraviolet, etc. (the related principles of using light to measure linear displacement and angular displacement have been published in the prior art, and will not be repeated herein). The path of the measurement light of the light emitting part 810 may be arranged perpendicular to the central axis. Specifically, when the central axis is arranged vertically, the measurement light may be arranged horizontally. After the rotating body 11 is assembled with the base 12, the path of the measurement light may be parallel to the end wall 15 of the rotating body 11.

After the rotating body 11 is assembled relative to the base 12, the measurement light of the light emitting part 810 is emitted to the reflecting part 820. When the measurement light is emitted to the reflecting teeth 821, the reflected measurement light is received by the light emitting part 810. When the measurement light is emitted to a gap between two adjacent reflecting teeth 821, the measurement light is not reflected, but is received by the light emitting part 810. However, receiving positions of the above two kinds of measurement light are different. Therefore, according to the receiving position of the measurement light, it is possible to know whether the measurement light is emitted to the reflecting teeth 821. The rotating body 11 rotates relative to the base 12, the reflecting teeth 821 move with the rotating body 11, and the measurement light continuously sweeps the reflecting teeth 821. The light emitting part 810 is configured to obtain a rotation angle of the reflecting part 820 relative to the light emitting part 810 by obtaining a quantity of the reflecting teeth 821 swept by the measurement light.

For example, when the central angle of a line that connects the centroid of two reflecting teeth 821 to the rotating axis is ten degrees, and the receiving portion of the measurement light has changed three times (the specific process is not deduced herein since it is known in the prior art), it may be known that the rotating body 11 has rotated a total of ten degrees during the time period of the three times of changes in the receiving portion of the measurement light. The above is only an example of a specific implementation of the angle measurement that use the light emitting part 810 and the reflecting part 820, and does not limit the structure of the angular displacement measurement device 800, other principles may also be adopted for angular displacement measurement by using the light emitting part 810 and the reflecting part 820, and no examples will be given herein.

In order to enable the light emitting part 810 to receive both the measurement light reflected by the reflecting teeth 821 and the measurement light not reflected by the reflecting teeth 821, the light emitting part 810 may include a first working body 811 and a second working body 812 that are disposed opposite to each other. The first working body 811 is configured to transmit and receive the measurement light. The second working body 812 is configured to receive the measurement light. The reflecting teeth 821 are disposed between the first working body 811 and the second working body 812. When the measurement light is reflected by the reflecting tooth 821, the first working body 811 receives the reflected measurement light. When the measurement light is not reflected by the reflecting tooth 821, the second working body 812 receives the measurement light. In particular, the light emitting part 810 may also be connected to a circuit board 13 on the base 12, and transmits an obtained angular displacement signal of the rotating body 11 to the circuit board 13. Therefore, the LiDAR 10 can control the rotation of the rotating body 11 according to the angular displacement signal of the rotating body 11.

In this embodiment, since the light emitting part 810 of the angular displacement measurement device 800 is positioned on the base 12 of the LiDAR 10 (that is, the light-emitting part 810 has a specific structure connected to the base 12), the light emitting part 810 can be assembled simultaneously with other parts of the base 12. Thus the assembling process of the light emitting part 810 does not consume too much extra man-hours. Similarly, the reflecting part 820 is mounted on the rotating body 11 (that is, the reflecting part 820 has a specific structure connected to the rotating body 11), thus the assembling process of the light emitting part 810 does not consume too much extra man-hours. Since the reflecting teeth 821 in FIGS. 2 to 6 are arranged vertically (when the rotating axis of the rotating body 11 is arranged vertically), and the measuring light is arranged horizontally, the reflecting teeth 821 and the light emitting part 810 do not have positional interference in the vertical direction. That is, after the rotating body 11 of the LiDAR 10 is assembled on the base 12, the light emitting part 810 directly cooperates with the reflecting part 820 on the rotating body 11, and there is no need to adjust the relative positions of the reflecting teeth 821 and the light emitting part 810. Compared with the existing technology in which the light emitting part 810 and the reflecting part 820 are assembled first (in the existing technology, these two components have positional interference in the vertical direction, so they need to be assembled in advance), and then during the process in which the rotating body 11 is assembled on the base 12, the reflecting part 820 is installed on the rotating body 11, and the light emitting part 810 is installed on the base 12, the present application greatly improves the installation efficiency.

In this embodiment, the arc may be a circular arc, and the center of the circle where the circular arc is located is on the rotating axis. That is, there is a circular arc segment that passes through each reflecting tooth 821 (specifically, it may pass through the centroid of each reflecting tooth 821), and the center of the circle where the circular arc segment is located is on the rotating axis. Thanks to this structure, the relative distance between each reflecting tooth 821 that reflects the measurement light and the light emitting part 810 does not change when the rotating body 11 rotates. In the case where the reflecting teeth 821 extend between the first working body 811 and the second working body 812 of the light emitting part 810, no matter how small the angle of rotation of the rotating body 11 is, the relative distance from each reflecting tooth 821 for reflecting the measurement light to the first working body 811 and the second working body 812 does not change, so that the path of the measurement light reflected by each reflecting tooth 821 is substantially the same, therefore the reflected measurement light is more conveniently to be received.

The measuring range of the angular displacement measurement device 800 may be set correspondingly according to the rotatable angle of the rotating body 11. For example, in the case where the rotating body 11 may only rotate within a range of ninety degrees, the central angle of the circular arc that each reflecting teeth 821 is located may only be ninety degrees, that is, the maximum measurement range of the angular displacement measurement device 800 is ninety degrees. In an embodiment, in order to make the angular displacement measurement device 800 more adaptable, the central angle of the circular arc that each reflecting teeth 821 is located may be equal to three hundred and sixty degrees, that is, each reflecting tooth 821 is disposed in a circle around the rotating axis of the rotating body 11. Specifically, the distance between every two adjacent reflecting teeth 821 may be equal. In this way, the theoretical measuring range of the angular displacement measurement device 800 may be infinite.

When the circular arc is less than three hundred and sixty degrees, the circular arc has two ends, so an initial position of the angular displacement measurement may be determined by finding the two ends of the circular arc (the circular arc is an imaged line which does not exist, and actually the initial position is determined by finding the position of the reflecting tooth 821 located at the end of the circular arc.) When the circular arc is three hundred and sixty degrees, and the position of each reflecting tooth 821 is distributed symmetrically about the rotating axis of the rotating body 11, the initial position of the angular displacement measurement device 800 may not be determined.

In order to maximize the measuring range of the angular displacement measurement device 800 and to easily determine the initial position, as shown in FIGS. 2 to 9, along the extending direction of the circular arc, the reflection distances of two adjacent reflecting teeth 821 are equal. When the central angle of the circular arc is less than three hundred and sixty degrees, the two reflecting teeth 821 at the two ends of the circular arc are a first initial tooth 8211 and a second initial tooth 8212, respectively. The distance between the first initial tooth 8211 and the second initial tooth 8212 is greater than the reflection distance and less than or equal to twice the reflection distance. When the distance between the first initial tooth 8211 and the second initial tooth 8212 is equal to twice the reflection distance, with respect to a structure in which each reflecting tooth 821 is disposed on a circle around the rotating axis and the distance between every two adjacent reflecting teeth 821 is equal, the present embodiment is equivalent to the case where one tooth is removed from the foregoing structure. Since the distance between the first initial tooth 8211 and the second initial tooth 8212 is different from the distance between other teeth, this difference may be used to determine the initial position.

In some embodiments, the reflecting part 820 may include only the reflecting teeth 821. The reflecting teeth 821 may be integrated with the end wall 15 of the rotating body 11. This eliminates the need for additional processing of the reflecting part 820, and also eliminates the assembly process of the reflecting part 820. Certainly, the reflecting teeth 821 may also be assembled on the end wall 15 of the rotating body 11 in a one-to-one correspondence.

In some embodiments, the reflecting part 820 may further include a connection member 822. The connection member 822 may be threadedly connected to the end wall 15 of the rotating body 11. That is, the reflecting part 820 may be connected to the end wall 15 of the rotating body 11 through the connection member 822. Each reflecting tooth 821 is connected to the connection member 822, so that each reflecting tooth 821 is fixed to the end wall 15 of the rotating body 11. The connection member 822 may be integrated with the reflecting teeth 821. When the reflecting part 820 is assembled, it is only necessary to assemble the connection member 822 on the end wall 15 of the rotating body 11 with a screw fastener.

In order to save materials, the connection member 822 may be elongated or curved in a circle arc shape. The central angle of the connection member 822 in shape of circle arc may be determined according to the arrangement position of each reflecting tooth 821. As shown in FIGS. 2 to 6, the connection member 822 may have a circular frame shape, the connection member 822 extends around the rotating axis, and the center of the connection member 822 is located on the rotating axis. Such a structure may make the relative distance between each reflecting tooth 821 that reflect the measurement light and the light emitting part 810 unchanged when the rotating body 11 rotates. When the reflecting teeth 821 extend between the first working body 811 and the second working body 812 of the light emitting part 810, no matter how small the angle of rotation of the rotating body 11 is, the relative distances from each reflecting tooth 821 reflecting the measurement light to the first working body 811 and the second working body 812 do not change, so that the path of the measurement light reflected by each reflecting tooth 821 is substantially the same, therefore the reflected measurement light is more conveniently to be received.

The angular displacement measurement device 800 needs to be disposed between the base 12 and the rotating body 11 of the LiDAR 10, which may make the gap between the rotating body 11 and the base 12 larger, and thus is not conducive to the positioning of the rotating body 11. In order to solve this problem, in some embodiments, a sink 16 may be provided on the end wall 15, and the connection member 822 may be embedded in the sink 16. The connection member 822 may be partially embedded in the sink 16. However, in order to reduce the gap between the rotating body 11 and the base 12 as much as possible, the connection member 822 may be completely embedded in the sink 16, that is, the depth of the sink 16 is greater than the thickness of the connection member 822 in the depth direction of the sink 16. The reflecting teeth 821 extend out of the sink 16 for reflecting the measurement light, and the part of the reflecting teeth 821 extending out of the sink 16 reflects the measurement light.

A shape of the reflecting teeth 821 may be determined according to an actual situation. The reflecting teeth 821 may be rectangular teeth or tapered teeth. When the reflecting teeth 821 are rectangular teeth, a thickness of the reflecting teeth 821 along the extending direction of the arc may be set according to an actual situation. For example, the thickness of the reflecting teeth 821 in the extending direction of the arc may be equal to a distance between two adjacent rectangular teeth.

The reflecting teeth 821 may extend perpendicularly to the end wall 15 of the rotating body 11, or may extend by an acute angle with the end wall 15 of the rotating body 11. The quantity of the reflecting teeth 821 has a great influence on measurement accuracy of the angular displacement measurement device 800. The larger the quantity of the reflecting teeth 821, the higher the measurement accuracy of the angular displacement measurement device 800. In order to facilitate dividing angles of integer degrees, the quantity of the reflecting teeth 821 may be an integer multiple of thirty-six. For example, the quantity of the reflecting teeth 821 may be thirty-six, seventy-two, or one hundred and eight.

The angular displacement measurement device 800b is shown in FIGS. 7 to 9. Compared with the angular displacement measurement device 800a in FIGS. 2 to 6, this device changes the structure of the reflecting part 820 and the light emitting direction of the light emitting part 810. In this embodiment, the reflecting part 820 is connected to an end wall 15 of the rotating body 11, and the reflecting part 820 also includes reflecting teeth 821 extending in a direction parallel to the end wall 15 of the rotating body 11. The measurement light emitted by the light emitting part 810 is parallel to the rotating axis of the rotating body 11.

The reflecting part 820 is in the shape of a ring-shaped plate. The outer edge of the reflecting part 820 is formed with a plurality of light transmitting holes 824 arranged in a circular array around a center thereof. Each light transmitting hole 824 has two reflecting teeth 821 on two sides thereof. The measuring light emitted by the light emitting part 810 is parallel to the rotating axis of the rotating body 11. The measuring light is reflected when it hits the reflecting teeth 821, while the measuring light is not reflected when it hits the light transmitting hole 824. Regardless of whether the measuring light is reflected, the measuring light is then received by the light emitting part 810. By analyzing the reflection of the light, the quantity of the reflecting teeth 821 swept by the measuring light can be obtained, and then the angle rotated by the reflecting part 820 can be obtained, and finally the angular displacement of the rotating body 11 can be obtained.

To enable the light emitting part 810 to receive both the measuring light reflected by the reflecting teeth 821 and the measuring light not reflected by the reflecting teeth 821, the light emitting part 810 may have a first working body 811 and a second working body 812 disposed oppositely. The first working body 811 is used for transmitting and receiving the measuring light, the second working body 812 is used for receiving the measuring light, and the reflecting teeth 821 are arranged between the first working body 811 and the second working body 812. When the measuring light is reflected by the reflecting teeth 821, the first working body 811 receives the reflected measuring light. When the measuring light is not reflected by the reflecting tooth 821, the second working body 812 receives the measuring light. In particular, the light emitting part 810 may also be connected to the circuit board on the base 12, and transmit the acquired angular displacement signal of the rotating body 11 to the circuit board, so that the LiDAR can be aligned according to the angular displacement signal of the rotating body 11 to control its rotation.

When the reflecting teeth 821 of the reflecting part 820 extend in a direction parallel to the end wall of the rotating body 11, the first working body 811 of the light emitting part 810 is located between the reflecting part 820 and the base 12, and the second working body 812 of the light emitting part 810 is located between the reflecting part 820 and the end wall of the rotating body 11. When the rotating axis of the rotating body 11 is arranged vertically, the first working body 811 of the light emitting part 810 is located below the reflecting part 820, and the second working body 812 of the light emitting part 810 is located above the reflecting part 820.

When the end wall 15 of the rotating body 11 has a sink 16, the reflecting part 820 in this embodiment can also be embedded in the sink 16. However, at the same time, since the light emitting part 810 is connected to the base 12, a part of the light emitting part 810 needs to be embedded in the sink 16.

In order to determine the initial position of the reflecting part 820 shown in FIGS. 7 to 9, it is also possible to make the width of one reflecting tooth 821 greater than the width of other reflecting teeth 821. Specifically, the width of the reflecting tooth 821 with a wider width may be twice that of other reflecting teeth 821.

The present application further provides a LiDAR 10, which includes a base 12, a rotating body 11, and the angular displacement measurement device 800 in any of the foregoing embodiments. The rotating body 11 may rotate relative to the base 12. The rotating body 11 is provided with a laser transmitting device and a laser receiving device. By rotating the rotating body 11 relative to the base 12, the path of the laser emitted by the laser transmitting device can be changed, thereby achieving the purpose of detecting objects in different areas. The angular displacement measurement device 800 can accurately control the rotation angle of the rotating body 11, and can accurately detect a predetermined area. The light emitting part 810 of the angular displacement measurement device 800 is provided on the base 12 of the LiDAR 10, and the reflecting part 820 is provided on the rotating part of the LiDAR 10. The angular displacement measurement device 800 is used to measure the rotation angle of the rotating body 11 of the LiDAR 10 relative to the base 12.

It is to be noted that the angular displacement measurement device 800 may be mounted on the mechanical LiDAR 10 shown in FIGS. 1 to 9, or may be mounted on any other rotatable LiDAR. It is not limited herein.

Figure 10:
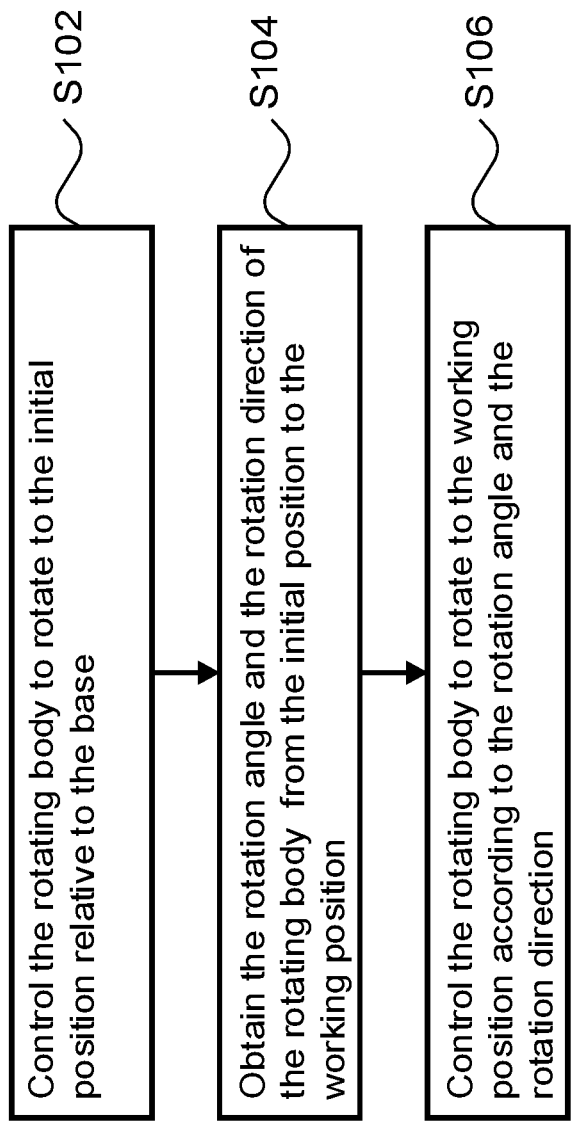
FIG. 10 is a flow diagram of an angle adjustment method provided in accordance with an embodiment of the present application.

FIG. 10 is a schematic flow diagram of an angle adjustment method according to an embodiment of the present application, which is used for angle adjustment of the LiDAR 10 shown in FIGS. 1 to 9. As described above, the LiDAR 10 may include a base 12 and a rotating body 11. The rotating body 11 may rotate relative to the base 12. A laser transmitting device and a laser receiving device are disposed in the rotating body 11. Because the rotating body 11 rotates relative to the base 12, a path of an emitted laser emitted by the laser transmitting device can be changed, and a purpose of detecting objects in different areas is achieved. In order to accurately detect a predetermined area, precise control of a rotation angle of the rotating body 11 is needed. The LiDAR 10 further includes an angular displacement measurement device 800. A light emitting part 810 of the angular displacement measurement device 800 is disposed on the base 12 of the LiDAR 10, and a reflecting part 820 is disposed on a rotating part of the LiDAR 10. The angular displacement measurement device 800 is configured to measure the rotation angle of the rotating body 11 of the LiDAR 10 relative to the base 12. As shown in FIG. 10, the angle adjustment method may include the following steps:

S102: Control the rotating body 11 to rotate to an initial position relative to the base 12.

After the LiDAR 10 is turned on, the rotating body 11 of the LiDAR 10 does not immediately rotate to the working position, but first finds a reference point of the angle. That is, the rotating body 11 may first rotate to an initial position relative to the base 12, and the initial position may be any reference point for realizing the setting.

S104: Obtain the rotation angle and the rotation direction of the rotating body 11 from the initial position to the working position.

After the rotating body 11 is rotated to the preset initial position, it may be rotate to the working position according to the rotation signal. In addition, since the overall position of the LiDAR 10 relative to the external environment may change, each rotation signal may be different, i.e., the data such as the angle of rotation and the direction of rotation of the rotating body 11 from the initial position to the working position may be different each time.

S106: Control the rotating body 11 to rotate to the working position according to the rotation angle and the rotation direction.

As described above, each reflecting tooth 821 of the angular displacement measurement device 800 of the LiDAR 10 is disposed on a common circular arc, and the center of the circle where the circular arc is located is on the rotating axis. Each reflecting tooth 821 is arranged at an equal interval. Along the extending direction of the circular arc, the distance between two adjacent reflecting teeth 821 is the reflection distance. When the central angle of the circular arc is less than three hundred and sixty degrees, the two reflecting teeth 821 at the two ends of the circular arc are the first initial tooth 8211 and the second initial tooth 8212, respectively. The distance between the first initial tooth 8211 and the second initial tooth 8212 is greater than the reflection distance and less than or equal to twice the reflection distance.

The step of controlling the rotating body 11 to rotate to an initial position includes: controlling the rotating body 11 to rotate to an area that an emission path of measurement light passes through between the first initial tooth 8211 and the second initial tooth 8212, that is, the initial position of the LiDAR 10 is determined by a difference in the distance between the first initial tooth 8211 and the second initial tooth 8212.

An existing LiDAR includes a transmitting device and a receiving device, where the transmitting device is configured to emit an emitted laser, and the receiving device is configured to receive a reflected laser reflected back by an object in a detection area. To avoid interference between the emitted laser and the reflected laser in the LiDAR, a baffle needs to be disposed in the LiDAR, where the baffle is configured to isolate the emitted laser from the reflected laser, but the existing baffle is less effective in isolation.

Therefore, the present application provides a new LiDAR 20 and a baffle fixing structure 600 for the LiDAR 20.

Figure 17:
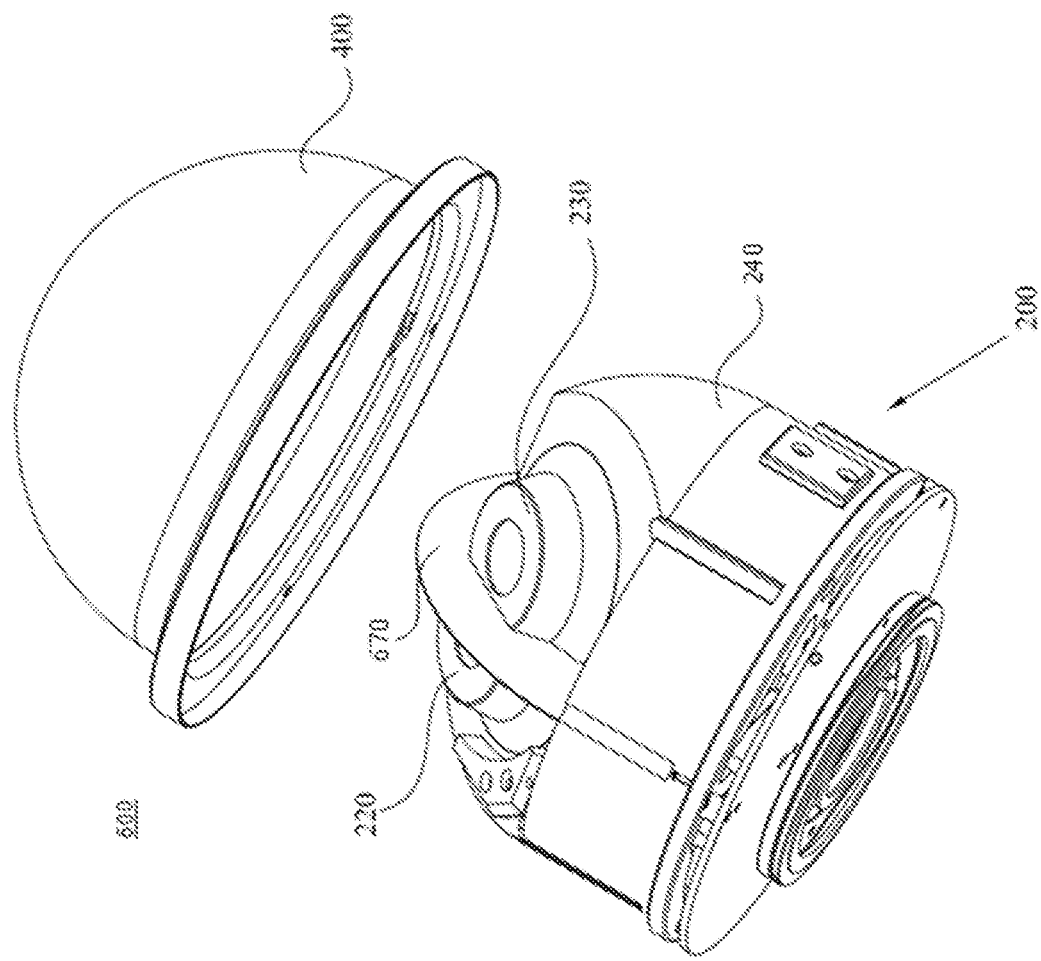
FIG. 17 is an exploded schematic diagram of a baffle fixing structure and a laser transceiver system provided according to an embodiment of the present application.
Figure 18:
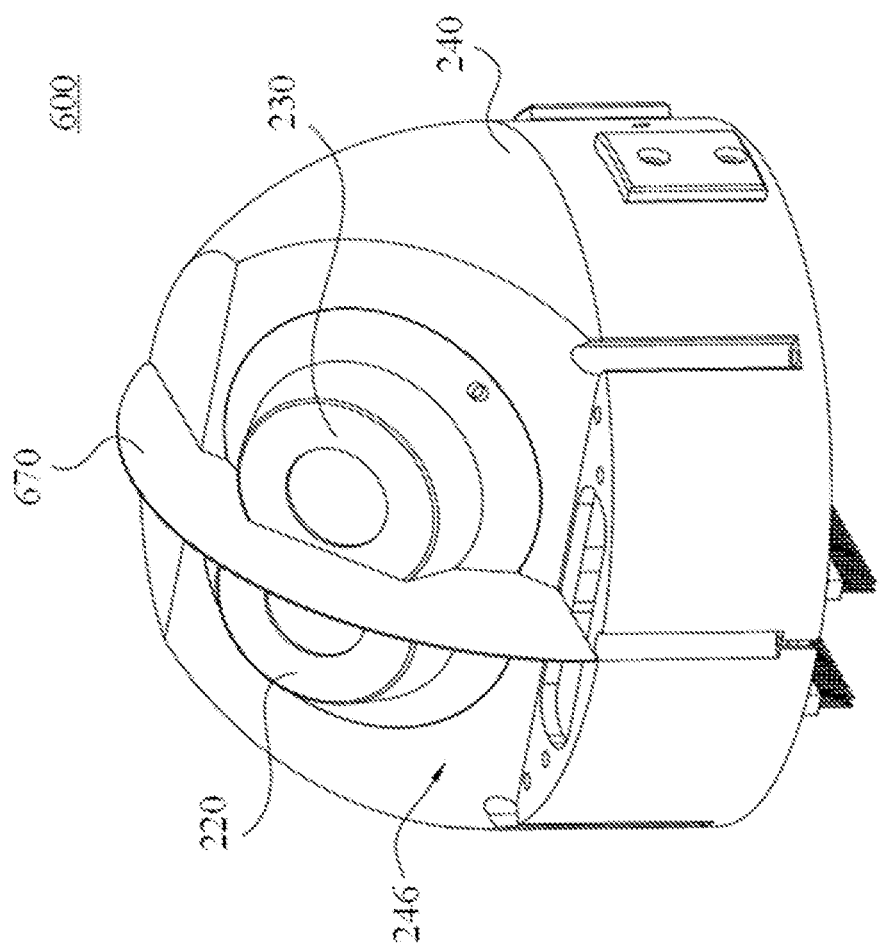
FIG. 18 is a perspective schematic diagram of a combination of an inner housing, a baffle, a transmitting lens, and a receiving lens provided in accordance with an embodiment of the present application.
Figure 19:
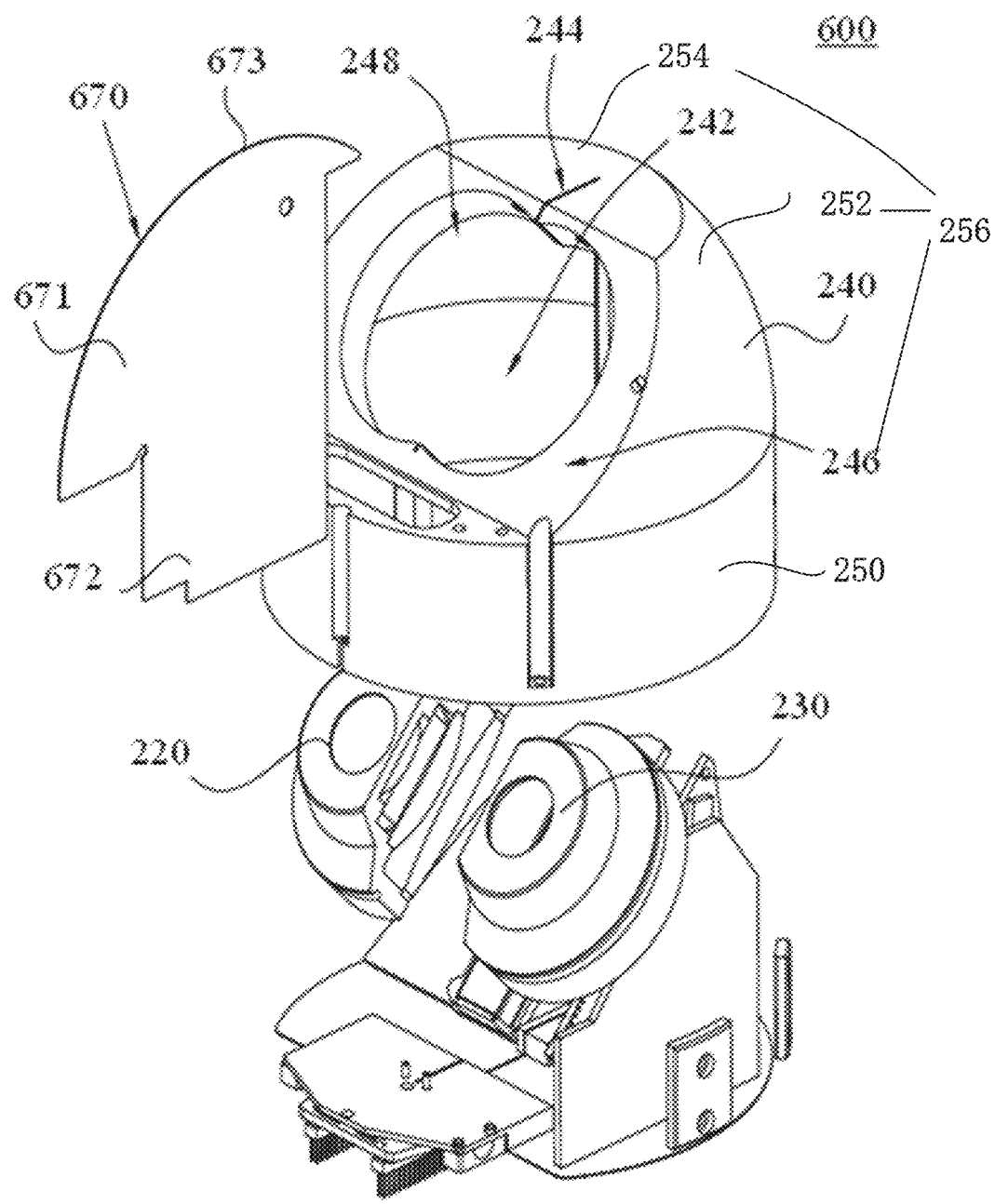
FIG. 19 is an exploded schematic diagram of a combination of an inner housing, a baffle, a transmitting lens, and a receiving lens provided in accordance with an embodiment of the present application.
Figure 20:
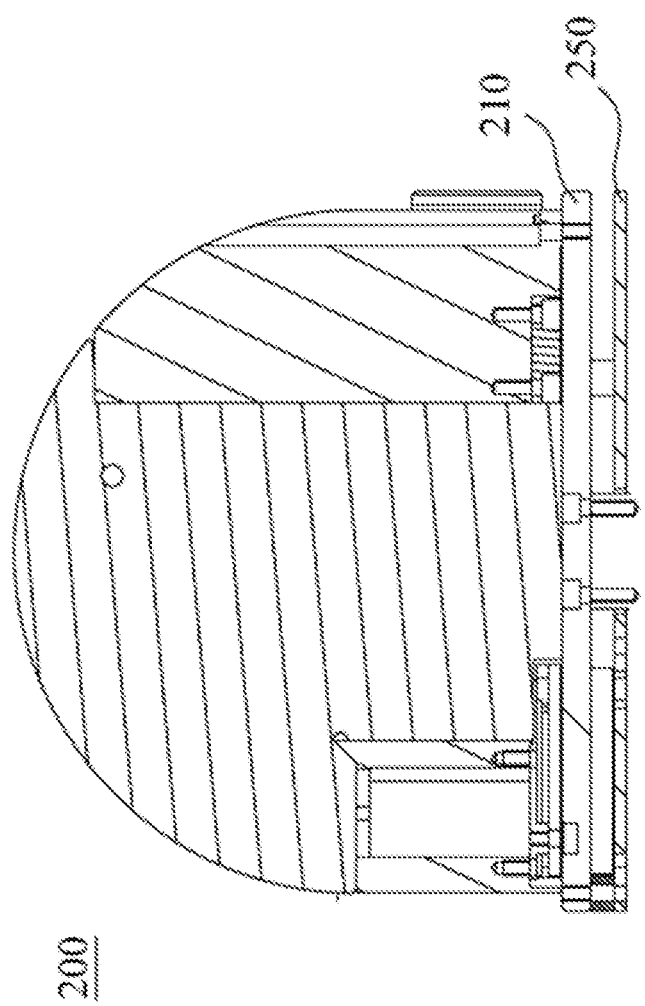
FIG. 20 is a cross-sectional diagram of a laser transceiver system provided in accordance with an embodiment of the present application.

FIGS. 17 to 19 show a baffle fixing structure 600 for a LiDAR 20 according to an embodiment of the present application. The LiDAR 20 includes a laser transceiver system 200. The laser transceiver system 200 may include a transmitting device and a receiving device, where the transmitting device is configured to emit an emitted laser, and the receiving device is configured to receive a reflected laser reflected back by an object in a detection area. The baffle fixing structure 600 may include an inner housing 240, an outer housing 400, and a baffle 670.

The inner housing 240 of the baffle fixing structure 600 may define an accommodating chamber 242. Both the transmitting device and the receiving device are disposed in the accommodating chamber 242 of the inner housing 240. The emitted laser generated by the transmitting device may pass through the inner housing 240 to travel outside the accommodating chamber 242, and the reflected laser may pass through the inner housing 240 to enter the accommodating chamber 242. The emitted laser and the reflected laser are likely to interfere with each other in the accommodating chamber 242.

As shown in FIG. 17, the outer housing 400 is sleeved over the inner housing 240 and spaced apart from the inner housing 240. The outer housing 400 is configured to protect the inner housing 240 or other components of the LiDAR 20. In some embodiments, in order to adjust a path of the emitted laser and that of the reflected laser, the transmitting device and the receiving device need to realize a function of rotation in the outer housing 400. The inner housing 240 rotates together with the transmitting device and the receiving device. Therefore, in order for the inner housing 240 to rotate smoothly, a gap needs to be reserved between the outer housing 400 and the inner housing 240, and the gap is used to prevent position interference between the inner housing 240 and the outer housing 400 when the inner housing 240 rotates.

As shown in FIGS. 17 to 19, the baffle 670 may include a first isolation portion 671 and a second isolation portion 672. The first isolation portion 671 is disposed in the inner housing 240 and configured to isolate the transmitting device from the receiving device. The second isolation portion 672 extends along an edge of the first isolation portion 671 to the space between the inner housing 240 and the outer housing 400, and is configured to isolate the emitted laser from the reflected laser between the outer housing 400 and the inner housing 240.

The first isolation portion 671 of the baffle 670 may divide the accommodating chamber 242 into two mutually isolated working chambers. The transmitting device and the receiving device are respectively arranged in the two working chambers. Therefore, the first isolation portion 671 of the baffle 670 may be configured to isolate the emitted laser from the incident light in the inner housing 240. The foregoing structure not only avoids laser interference in the housing, but also avoids laser interference between the inner housing 240 and the outer housing 400, thereby achieving a better isolation effect.

The baffle 670 may be integrated with the inner housing 240 or may be disposed separately from the inner housing 240. When the baffle 670 is disposed separately from the inner housing 240, an isolation slit 244 may be disposed on the inner housing 240. The baffle 670 passes through the isolation slit 244. After the baffle 670 passes through the isolation slit 244, a portion of the baffle 670 located between the inner housing 240 and the outer housing 400 is referred to as the second isolation portion 672, and a portion of the baffle 670 located in the inner housing 240 is referred to as the first isolation portion 671.

The inner housing 240 may further have a recessed portion 246. The recessed portion 246 is recessed in a direction away from the outer housing 400, so that a space of a certain size is formed between the inner housing 240 and the outer housing 400. A working port 248 is disposed at the recessed portion 246 of the inner housing 240. The LiDAR 20 further includes a transmitting lens 220 and a reflecting lens 230 (it may be understood that the reflecting lens 230 may be configured to receive the reflected laser that is reflected back, and therefore may be referred to as a receiving lens 230 in some embodiments). The emitted laser passes through the transmitting lens 220 to travel outside the inner housing 240, and the reflected laser passes through the reflecting lens 230 to enter the inner housing 240. The transmitting lens 220 and the reflecting lens 230 (receiving lens 230) are both disposed at the working port 248. A relatively large space exists between the recessed portion 246 of the inner housing 240 and the outer housing 400, and the emitted laser and the reflected laser respectively pass through in the space. The inner housing 240 includes a first housing part 250 and a second housing part 256. The second housing part 256 includes a first part 254, a second part 246, and a third part 252. The first part 254 is spaced apart from the first housing part 250. The second part 246 and the third part 252 are connected between the first part 254 and the first housing part 250 and together form an accommodating chamber. Both of the first part 254 and the second part 246 are flat, with the second part 246 being skewed relative to the first part 254. The second part 246 is provided with a working port 248 and an isolation slit 244 communicating with the working port 248.

In order to prevent the emitted laser and the reflected laser in the foregoing space from interfering with each other, the isolation slit 244 of the inner housing 240 may be disposed in the recessed portion 246 of the inner housing 240. After the baffle 670 passes through the isolation slit 244, the foregoing space is separated into two relatively independent portions. The transmitting lens 220 and the reflecting lens 230 (receiving lens 230) are arranged on two opposite sides of the baffle 670 in a one-to-one correspondence.

The working port 248 may be a complete large hole or two independent small holes. When the working port 248 is two independent small holes, the isolation slit 244 may be located between the two small holes.

When the working port 248 is a large hole, the isolation slit 244 passes through the working port 248 and has an overlapping portion with the working port 248. Specifically, the isolation slit 244 may be located in the middle of the working port 248 and divide the working port 248 into two equal parts. The transmitting lens 220 is disposed in one part of the working port 248, and the receiving lens 230 (receiving lens 230) is disposed in the other part. In this case, the transmitting lens 220 and the reflecting lens 230 (receiving lens 230) are respectively attached to two opposite surfaces of the baffle 670, so that the laser passing through the transmitting lens 220 and the laser passing through the reflecting lens 230 (receiving lens 230) are unlikely to interfere with each other. When the working port 248 is configured based on the foregoing structure, the transmitting lens 220, the baffle 670, and the reflecting lens 230 (receiving lens 230) collectively fill the working port 248.

In an embodiment, the second isolation portion 672 of the baffle 670 may include a sealed edge 673 located between the outer housing 400 and the inner housing 240 and facing the outer housing 400. The sealed edge 673 is spaced apart from an inner side wall of the outer housing 400, and a distance between the sealed edge 673 and the inner side wall of the outer housing 400 is equal everywhere. To be specific, it may be understood that an edge of the second isolation portion 672 facing the outer housing 400 depends on a shape of an inner surface wall of the outer housing 400. If no gap is needed between the second isolation portion 672 and the outer housing 400 (the gap is used to facilitate rotation of the baffle 670 relative to the outer housing 400), the sealed edge 673 of the baffle 670 may be tightly attached to the inner surface wall of the outer housing 400.

In an embodiment, the outer housing 400 may be a hemispherical housing. When the outer housing 400 is a hemispherical housing, the sealed edge 673 of the baffle 670 has an arc shape that corresponds to the shape of the inner surface wall of the outer housing 400. The hemispherical housing structure of the outer housing 400 can facilitate rotation of the inner housing 240 therein on the one hand, and can maximally save manufacturing materials on the other hand. The outer housing 400 is made of a transparent material, so that the emitted laser can pass through the outer housing 400 to travel outside the outer housing 400, and that the reflected laser can pass through the outer housing 400 to enter the outer housing 400.

As described above, the emitted laser may pass through the transmitting lens 220 to travel outside the inner housing 240, and further pass through the outer housing 400 to travel toward a target object; and the reflected laser passes through the outer housing 400 and further passes through the reflecting lens 230 (receiving lens) to enter the inner housing 240.

Figure 11:
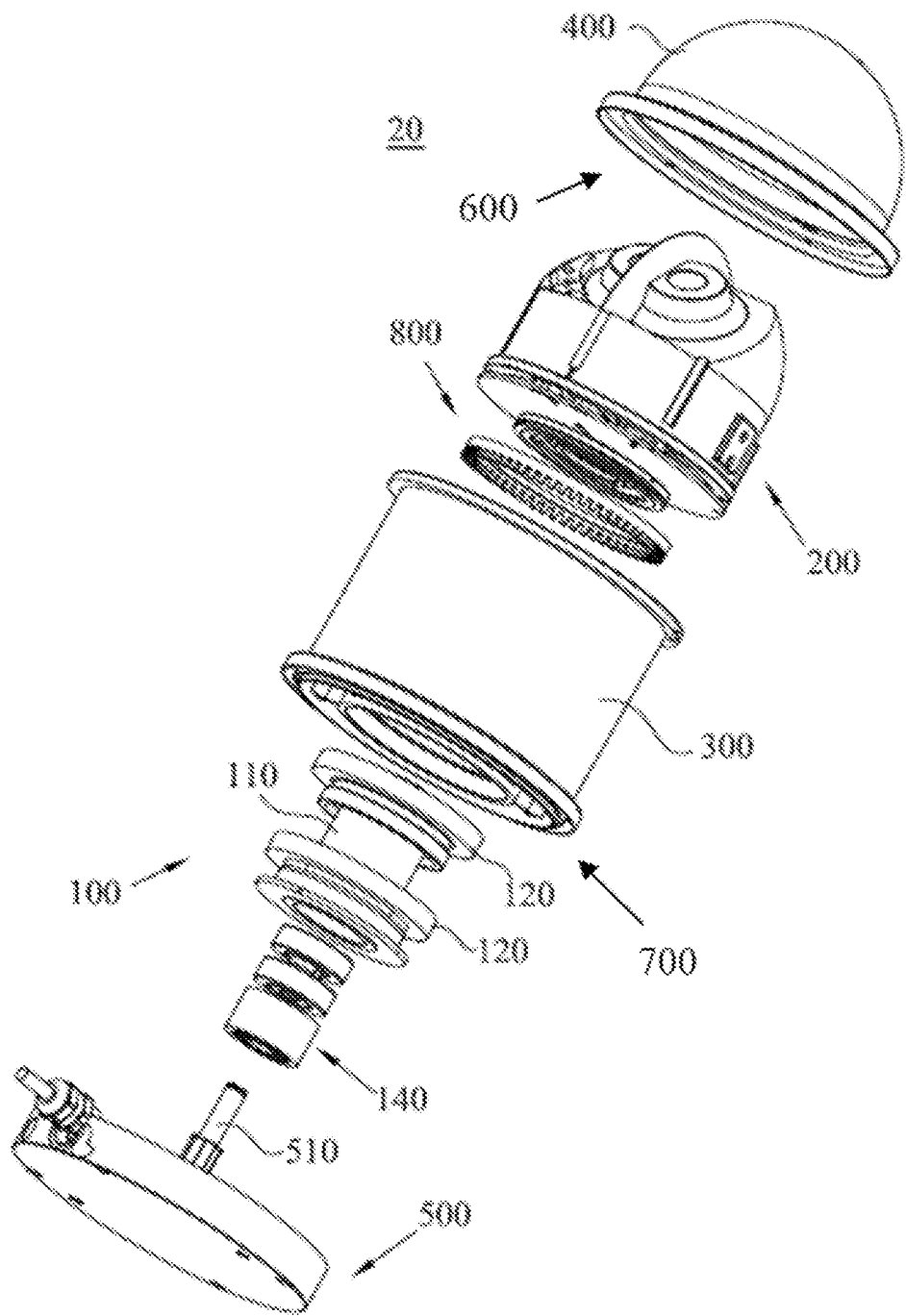
FIG. 11 is an exploded schematic diagram of another LiDAR provided in accordance with an embodiment of the present application.
Figure 12:
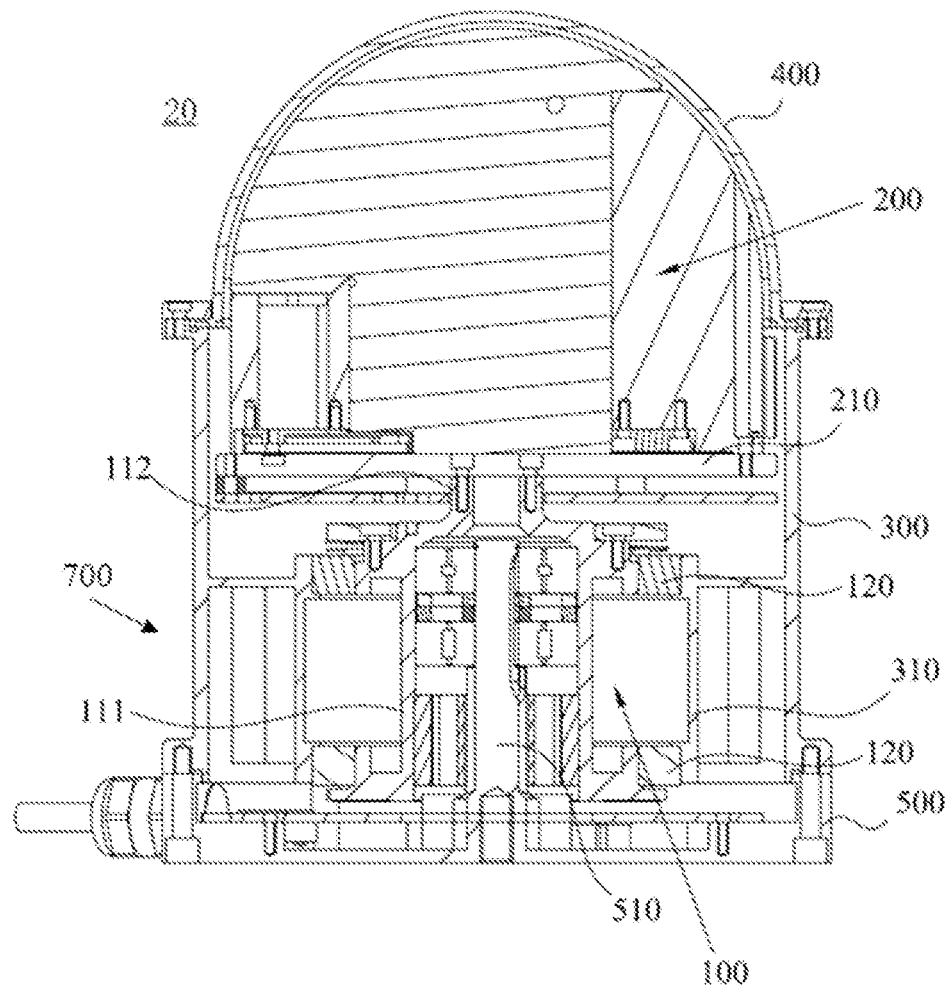
FIG. 12 is a first cross-sectional diagram of another type of LiDAR provided in accordance with an embodiment of the present application.

It may be understood that the present application further provides a LiDAR 20, as shown in FIG. 11 and FIG. 12. The LiDAR 20 includes the baffle fixing structure in any one of the foregoing embodiments. Specifically, the LiDAR 20 may further include a laser transceiver system 200 and a rotating system 100.

In this embodiment, because a laser emitted by a transmitting device and a laser received by a receiving device in the laser transceiver system 200 do not need to avoid rotating parts, an optical path is simple, and no optical element for adjusting the path of the laser is needed. Therefore, an overall cost of the LiDAR 20 is reduced. In addition, because the laser transceiver system 200 is detachably connected to the rotating system 100, the two are relatively independent when they are not connected, manufacturing processes of the two can be independent of each other, and both may be produced by modular production at the same time, thereby greatly increasing efficiency of production of the LiDAR 20.

A rotating system of a LiDAR in the prior art includes a rotating body. The rotating body includes a shaft body connected to a laser transceiver system and a driving body connected to the shaft body. The driving body is configured to obtain a driving force for rotation, and the shaft body is configured to transmit a torque to the laser transceiver system. In order to facilitate the connection, a diameter of the shaft body is relatively small. In the prior art, a bearing is sleeved over the shaft body, which makes a length of the shaft body larger. Therefore, the length of the shaft body is larger, and an overall length of the LiDAR is larger.

Therefore, the present application provides a new LiDAR 20 and a bearing mounting structure 700 for the LiDAR 20.

As shown in FIGS. 11 to 16, the bearing mounting structure 700 may include a rotating body 110. In some embodiments, the bearing mounting structure 700 may further include a first housing 300 and a bearing 120.

As shown in FIGS. 11 to 16, the rotating body 110 may include a shaft body 112 connected to a laser transceiver system 200 and a driving body 111 connected to the shaft body 112. The driving body 111 is configured to obtain a driving force for rotation. The shaft body 112 is configured to transmit a torque to the laser transceiver system 200. The driving body 111 may be connected to a driving device 140 (for example, a driving motor 140) of the LiDAR 20 to obtain the driving force of the driving device (driving motor 140). In order to facilitate the connection with the laser transceiver system 200 for transmitting the driving force, a diameter of the shaft body 112 is smaller than a diameter of the driving body 111.

The shaft body 112 is connected to an end of the driving body 111, and an end of the shaft body 112 away from the driving body 111 is screwed to the laser transceiver system 200.

The first housing 300 defines an internal chamber 320. The rotating body 110 is disposed in the internal chamber 320 of the first housing 300. The internal chamber 320 of the first housing 300 is further provided with a fixing structure 310.

The bearing 120 includes an inner ring body and an outer ring body surrounding the inner ring body. The inner ring body of the bearing 120 is sleeved over an outer peripheral wall of the driving body 111, and the outer ring body of the bearing 120 is connected to the fixing structure 310 of the first housing 300, so that the rotating body 110 can be carried by the fixing structure 310 while rotating relative to the fixing structure 310. Balls or rollers may be disposed between the outer ring body and the inner ring body of the bearing 120. A specific structure of the bearing 120 depends on actual needs.

Because the inner ring body of the bearing 120 is connected to the outer peripheral wall of the driving body 111, in comparison with a structure that connects the bearing 120 to the shaft body 112 of the rotating body 110, a length of the shaft body 112 can be reduced, and the connection between the bearing 120 and the outer peripheral wall of the driving body 111 does not need to increase a length of the driving body 111. Therefore, the bearing mounting structure 700 provided in the present application can reduce an overall length of the LiDAR 20. In addition, because the length of the shaft body 112 is reduced, deflection of the shaft body 112 when subjected to bending moments is also reduced, and structural stability thereof is thus improved. Moreover, because a diameter of a horizontal cross-section of the driving body 111 is larger, the bearing 120 may be larger, to increase an ultimate bearing capacity of the bearing 120 and make its transmission stability stronger.

The fixing structure 310 only needs to fix the outer ring body of the bearing 120. However, in order to make the connection to the bearing 120 more stable, the fixing structure 310 may define an accommodating chamber 311 that penetrates both ends. The inner ring body of the bearing 120 is sleeved over the outer peripheral wall of the driving body 111. The driving body 111 is located in the accommodating chamber 311. The outer ring body of the bearing 120 is disposed in the accommodating chamber 311 of the fixing structure 310 and connected to an inner peripheral wall of the accommodating chamber 311, so that the outer ring body can be fixed in all peripheral directions, thereby improving stability of the connection.

After the bearing 120 is connected to an inner peripheral wall of the internal chamber 320, the bearing 120 tends to slide axially toward the inner peripheral wall (that is, when the internal chamber 320 penetrates up and down, the bearing 120 can easily slide up and down). In order to avoid the foregoing problem, an abutment flange 312 may be further provided in the internal chamber 320 of the fixing structure 310. Specifically, the abutment flange 312 is disposed in the internal chamber 320 of the fixing structure 310. The abutment flange 312 extends along the inner peripheral wall of the internal chamber 320 toward the center of the internal chamber 320. The bearing 120 abuts against a surface of the abutment flange 312 that faces an outer side of the internal chamber 320, to limit freedom of the bearing 120 to slide in an axial direction of the internal chamber 320. It should be noted that there are two "surfaces of the abutment flange 312 that face an outer side of the internal chamber 320," but in the present application, the foregoing surface specifically refers to one of the two surfaces that is close to a port of the internal chamber 320. For example, when the internal chamber 320 penetrates up and down, if the abutment flange 312 is close to an upper port of the internal chamber 320, the foregoing surface refers to an upper surface of the abutment flange 312. If the abutment flange 312 is close to a lower port of the internal chamber 320, the foregoing surface refers to a lower surface of the abutment flange 312.

The abutment flange 312 may be in any shape, provided that the abutment flange 312 can restrict the sliding of the bearing 120. However, in order to allow the abutment flange 312 to withstand a great thrust from the bearing 120, in the present application, the abutment flange 312 may be in a ring shape, and the abutment flange 312 includes an inner hole, where an inner diameter of the inner hole of the abutment flange 312 is larger than an inner diameter of the outer ring body of the bearing 120, so that the outer ring body of the bearing 120 is easy to disassemble.

The rotating body 110 may be connected to only one bearing 120. However, when connected to one bearing 120, the rotating body 110 is easily deflected. In the present application, the bearing mounting structure includes two bearings 120. Inner ring bodies of the two bearings 120 are respectively sleeved over the outer peripheral wall of the driving body 111. The two bearings 120 are respectively distributed at two ends of the driving body 111. Further, when two bearings 120 are provided, the fixing structure 310 includes two abutment flanges 312. The two abutment flanges 312 are arranged adjacent to two ends of the accommodating chamber 311 respectively. One of the bearings 120 abuts against a surface of one of the two abutment flanges 312 facing an outer side of the accommodating chamber 311, and the other bearing 120 abuts against a surface of the other abutment flange 312 facing an outer side of the accommodating chamber 311.

The rotating body 110 may be positioned on the fixing structure 310 by the bearing 120, so that the rotating body 110 can rotate relative to the fixing structure 310, that is, the fixing structure 310 of the first housing 300 provides the rotating body 110 with an upward bearing force. In addition, the first housing 300 and the rotating body 110 are connected by the bearing 120, so that the rotating body 110 can further rotate relative to the fixing structure 310 while the fixing structure 310 provides the rotating body 110 with the upward bearing force.

A rotatable LiDAR in the prior art includes a housing and a base connected to a lower end of the housing. The base includes a positioning column extending upward, and the positioning column extends into an internal center of the housing. A driving device is connected between the positioning column and the housing to drive the housing to rotate relative to the positioning column. The housing has a laser transmitting device and a laser receiving device. The laser transmitting device and the laser receiving device may rotate together with the housing, to detect objects in different areas.

FIGS. 11 to 14 show schematic diagrams of a LiDAR 20 provided according to an embodiment of the present application. As shown in FIGS. 11 to 14, the LiDAR 20 may include a laser transceiver system 200. In some embodiments, the LiDAR 20 may further include a rotating system 100. In some embodiments, the LiDAR 20 may further include a baffle fixing structure 600 for the LiDAR 20. In some embodiments, the LiDAR 20 may further include a bearing mounting structure 700 for the LiDAR 20. In some embodiments, the LiDAR 20 may further include an angular displacement measurement device 800.

The laser transmitting system 200 includes a transmitting device and a receiving device. The transmitting device is configured to emit an emitted laser and the receiving device is configured to receive a reflected laser. The reflected laser is the laser reflected back by an object in a detection area. After the transmitting device emits the emitted laser, the emitted laser hits the detected object in the detection area and is reflected back to the laser transceiver system 200. The reflected laser that is reflected back is received by the receiving device. By comparing changes of related parameters between the laser emitted by the transmitting device and the laser received by the receiving device, relevant information of the detected object such as distance, orientation, height, speed, posture and even shape may be obtained.

The rotating system 100 is disposed on one side of the laser transceiver system 200 and detachably connected to the laser transceiver system 200. The rotating system 100 is configured to drive the laser transceiver system 200 to rotate, to change a path of the emitted laser and a path of the reflected laser. By changing the path of the emitted laser, the path of the reflected laser is changed. By changing the path of the emitted laser and the path of the reflected laser, a sweep area of the LiDAR 20 may be changed, so that application scenarios of the LiDAR 20 are expanded.

The rotating system 100 may be specifically disposed in any position of the laser transceiver system 200, and the relative positions of the two depend on actual requirements. However, for ease of description, the following uses an example of the rotating system 100 disposed below the laser transceiver system 200 for illustration. It should be noted that the rotating system 100 may also be disposed in other positions, for example, above the laser transceiver system 200 or to the left or right of the laser transceiver system 200, and is not limited herein.

When the rotating system 100 is disposed below the laser transceiver system 200, an upper end of the rotating system 100 is detachably connected to a lower end of the laser transceiver system 200. Specifically, the two may be connected by screw connection, snap connection, magnetic attraction, etc. In order to obtain a stable driving force, rotating parts of the rotating system 100 may be screwed to the laser transceiver system 200.

In this embodiment, because the laser emitted by the transmitting device and the laser received by the receiving device in the laser transceiver system 200 do not need to avoid the rotating parts, an optical path is simple, and no optical element for adjusting the path of the laser is needed. Therefore, an overall cost of the LiDAR 20 is reduced. In addition, because the laser transceiver system 200 is detachably connected to the rotating system 100, the two are relatively independent when they are not connected, manufacturing processes of the two can be independent of each other, and both may be produced by modular production at the same time, thereby greatly increasing efficiency of production of the LiDAR 20.

In an embodiment, the rotating system 100 may include a rotating body 110. The rotating body 110 may be the rotating body 110 in the foregoing bearing mounting structure 700. The rotating body 110 rotates around its own central axis. When the rotating system 100 is disposed below the laser transceiver system 200, the central axis of the rotating body 110 is arranged vertically. An end of the rotating body 110 near the laser transceiver system 200 is screwed to the laser transceiver system 200 to drive the laser transceiver system 200 to rotate around the central axis. When the rotating body 110 rotates around its own central axis, the entire laser transceiver system 200 also rotates around the central axis of the rotating body 110, and the path of the emitted laser emitted by the transmitting device of the laser transceiver system 200 changes accordingly.

In the threaded connection between the rotating body 110 and the laser transceiver system 200, a screw hole may be provided in the rotating body 110. A screw or bolt disposed in the laser transceiver system 200 extends from the laser transceiver system 200 into the screw hole in the rotating body 110 and is threadedly connected to the screw hole. Certainly, an outer thread may also be directly provided at an end of the rotating body 110. For example, an outer thread is provided on a shaft body 112, a connecting hole is provided on the laser transceiver system 200, an inner thread is provided on an inner surface wall of the connecting hole, and the outer thread on the rotating body 110 cooperates with the inner thread in the connecting hole to implement a threaded connection between the rotating body 110 and the laser transceiver system 200. The threaded connection between the rotating body 110 and the laser transceiver system 200 is not limited to the above situation, and will not be repeated herein.

After the rotating body 110 is disposed below the laser transceiver system 200, the rotating body 110 and the laser transceiver system 200 may also be connected only by a shaft and a hole. For example, a connecting shaft is disposed at an upper end of the rotating body 110, and a connecting hole is disposed at a lower end of the laser transceiver system 200. The connecting shaft extends into the connecting hole to complete the detachable connection of the rotating body 110 and the laser transceiver system 200, and horizontal cross sections of the connecting shaft and the connecting hole may not be circular, so that the rotating body 110 may drive the laser transceiver system 200 to rotate. Certainly, the foregoing connecting shaft may be disposed on the laser transceiver system 200, and the foregoing connecting hole may be disposed on the rotating body 110.

In some embodiments, the rotating system 100 may further include a base 500. The base 500 may include a positioning column 510 extending in a direction parallel to the central axis of the rotating body 110. The rotating body 110 includes a rotating cavity having an opening that is away from the laser transceiver system (that is, the opening of the rotating cavity 113 is disposed downward). The positioning column 510 extends into the rotating cavity 113 from the bottom up. After the positioning column 510 extends into the rotating cavity 113, the positioning column 510 is located at the center of the rotating cavity 113.

In some embodiments, the rotating system 100 may further include a driving motor 140. The driving motor 140 is positioned on the positioning column 510 of the base 500, and drives the rotating body 110 to rotate around the positioning column 510. Specifically, the driving motor 140 may include a stator 141 and a rotor 142. The stator 141 of the driving motor 140 is sleeved over the positioning column 510. The rotor 142 of the driving motor 140 is connected to an inner peripheral wall of the rotating cavity 113. When the driving motor 140 works, the rotor 142 rotates around the stator 141, such that the rotating body 110 is driven by the rotor 142 to rotate around the positioning column 510 of the base 500, and then the laser transceiver system 200 is driven by the rotating body 110 to rotate relative to the base 500, and a purpose of changing the path of the laser emitted by the laser transceiver system 200 is finally achieved.

The LiDAR 20 may further include a first housing 300. The first housing 300 may be the first housing 300 in the foregoing bearing mounting structure 700. The first housing 300 defines an internal chamber 320. The rotating system 100 is disposed in the internal chamber 320, so that the first housing 300 protects the rotating system 100 well. The first housing 300 may include a rotating port 321 at an upper end thereof and a fixed port 322 at a lower end thereof. Both the rotating port 321 and the fixed port 322 penetrate the internal chamber 320 of the first housing 300. The rotating system 100 is specifically disposed in the internal chamber 320 and near the fixed port 322. The fixed port 322 of the first housing 300 may be fixedly connected to the base 500. The laser transceiver system 200 originates a rotary motion at the rotating port 321 of the first housing 300.

In an embodiment, the rotating body 110 may be positioned on the positioning column 510 of the base 500, that is, the positioning column 510 provides the rotating body 110 with an upward bearing force. However, the positioning column 510 in the foregoing structure needs to provide the rotating body 110 with both a torque and a bearing force. Therefore, high requirements are imposed on mechanical properties of the positioning column 510. However, because the positioning column 510 is disposed in the rotating cavity 113 of the rotating body 110, and its size is limited, actual requirements can be hardly met.

In this embodiment, the first housing 300 may include a fixing structure 310 disposed in the internal chamber 320. The rotating body 110 is positioned on the fixing structure 310 by a bearing 120, so that the rotating body 110 can rotate relative to the fixing structure 310. To be specific, the fixing structure 310 of the first housing 300 provides the rotating body 110 with an upward bearing force (when the rotating system 100 is disposed in another position of the laser transceiver system 200, the first housing 300 provides the rotating body 110 with a bearing force in another direction). In addition, the first housing 300 and the rotating body 110 are connected by the bearing 120, so that the rotating body 110 can further rotate relative to the fixing structure 310 while the fixing structure can provide the rotating body 110 with an upward bearing force.

When the rotating system 100 is disposed below the laser transceiver system 200, the bearing 120 between the rotating body 110 and the fixing structure 310 needs to transmit a vertically upward bearing force. The bearing 120 may be a thrust bearing, and the thrust bearing is disposed at a lower end of the rotating body 110. One side of the bearing abuts against the rotating body 110 and another side is fixed to the fixing structure 310 of the first housing 300. The thrust bearing can provide the rotating body 110 with a great thrust while ensuring that the rotating body 110 can rotate relative to the fixing structure 310. When the bearing 120 connected to the rotating body 110 is a thrust bearing, the thrust bearing may also be fixed to the base 500. That is, after the positioning column 510 of the base 500 passes through the thrust bearing, an upper surface of the thrust bearing abuts against the rotating body 110, and a lower surface thereof is positioned on the base 500. Certainly, a form and specific structure of the bearing 120 depend on actual requirements.

In an embodiment, the rotating body 110 may be configured to carry the laser transceiver system 200. That is, the rotating body 110 provides the laser transceiver system 200 with a vertically upward thrust. In this case, the bearing 120 between the rotating body 110 and the first housing 300 receives a combined gravity of both the rotating body 110 and the laser transceiver system 200. Certainly, in another embodiment, another structure may be disposed on the first housing 300, and the bearing 120 is connected between the structure and the laser transceiver system 200, so that the first housing 300 can also produce relative rotation with the laser transceiver system 200 while carrying the gravity of the laser transceiver system 200.

As described above, the rotating body 110 may include a driving body 111 and a shaft body 112 located on the driving body 111; the driving body 111 defines the foregoing rotating cavity 113 with an opening that faces the fixed port 322; the shaft body 112 is connected to one end of the driving body 111 away from the fixed port 322; and one end of the shaft body 112 away from the driving body 111 is threadedly connected to the laser transceiver system 200. With this arrangement, an outer peripheral wall of the driving body 111 can be sleeved over the bearing 120. Because a horizontal cross section of the driving body 111 is relatively large, a relatively large bearing 120 can be provided to increase an ultimate bearing capacity of the bearing 120. In addition, the bearing 120 is disposed on the peripheral wall of the driving body 111 instead of being disposed in a vertical position of the rotating body 110 (that is, above or below the rotating body 110). This can reduce the space vertically occupied by the rotating system 100, thereby reducing an overall vertical height of the LiDAR 10 (when the laser transceiver system 200 and the rotating system 100 are arranged vertically).

The base 500 may be integrated with the first housing 300. However, in order to facilitate disassembly of the LiDAR 20, in this embodiment, the base 500 is detachably connected to one end of the first housing 300 at the fixed port 322. The positioning column 510 extends from the fixed port 322 toward the rotating port 321. Specifically, the base 500 may be connected to the first housing 300 by using threaded fasteners. When the base 500 is connected to the fixed port 322 of the first housing 300, the base 500 may cover the fixed port 322 of the first housing 300, and the base 500 may also be used to carry the first housing 300. That is, the base 500 provides the first housing 300 with a vertically upward bearing force. In another embodiment, alternatively, the first housing 300 may carry the base 500. That is, the base 500 is connected to the fixed port 322 of the housing and then suspended, the bearing force of the base 500 is provided by the threaded connection between the base 500 and the first housing 300, and the overall bearing force of the LiDAR 20 is provided by the first housing 300.

Figure 16:
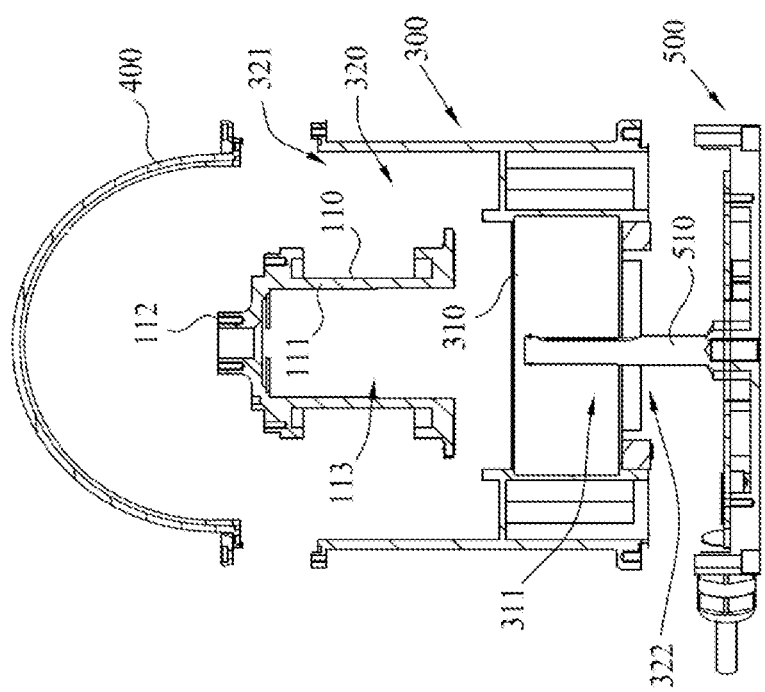
FIG. 16 is a cross-sectional diagram of a base, a rotating body, a first housing, and a second housing provided in an embodiment of the present application.

In some embodiments, the fixing structure 310 of the first housing 300 may be a horizontally disposed ring-shaped bearing platform. However, in order to facilitate mounting and fixing of the rotating body 110 and the bearing 120, in some embodiments, as shown in FIG. 16, the fixing structure 310 defines an accommodating chamber 311 that penetrates both ends. The bearing 120 may include an inner ring and an outer ring surrounding the inner ring. Balls or rollers may be provided between the outer ring and the inner ring. The inner ring of the bearing 120 is sleeved over an outer peripheral wall of the rotating body 110. The outer ring is disposed in the accommodating chamber 311 of the fixing structure 310 and connected to an inner peripheral wall of the fixing structure 310.

Figure 13:
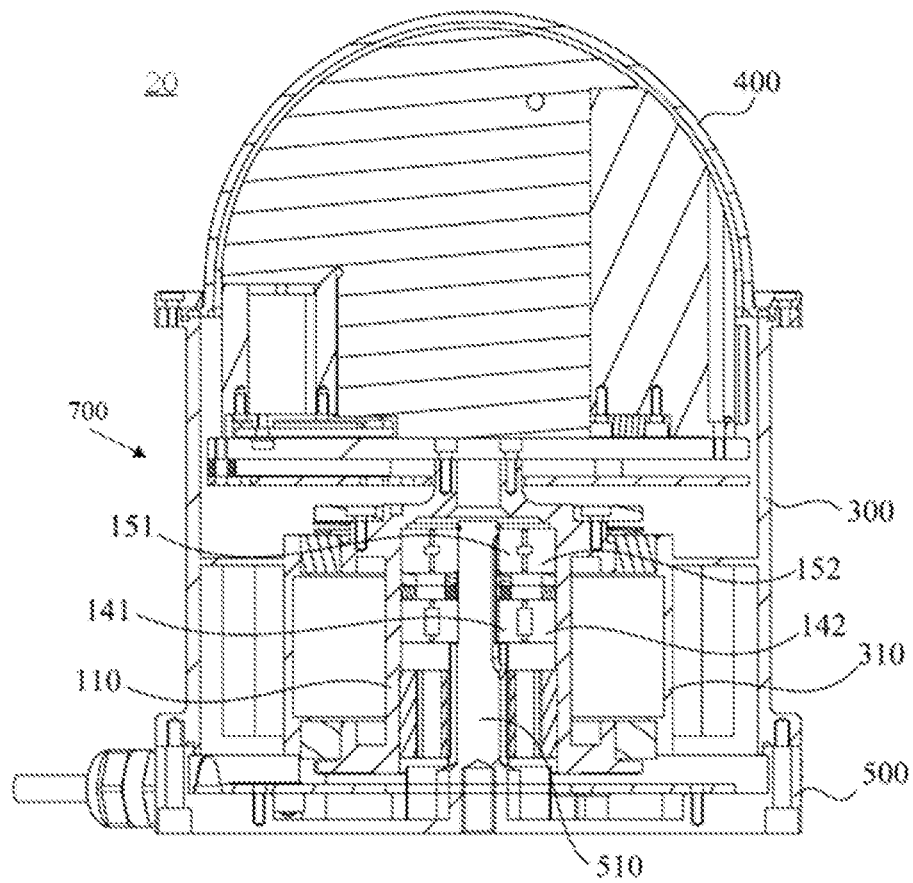
FIG. 13 is a second cross-sectional diagram of another type of LiDAR provided in accordance with an embodiment of the present application.
Figure 14:
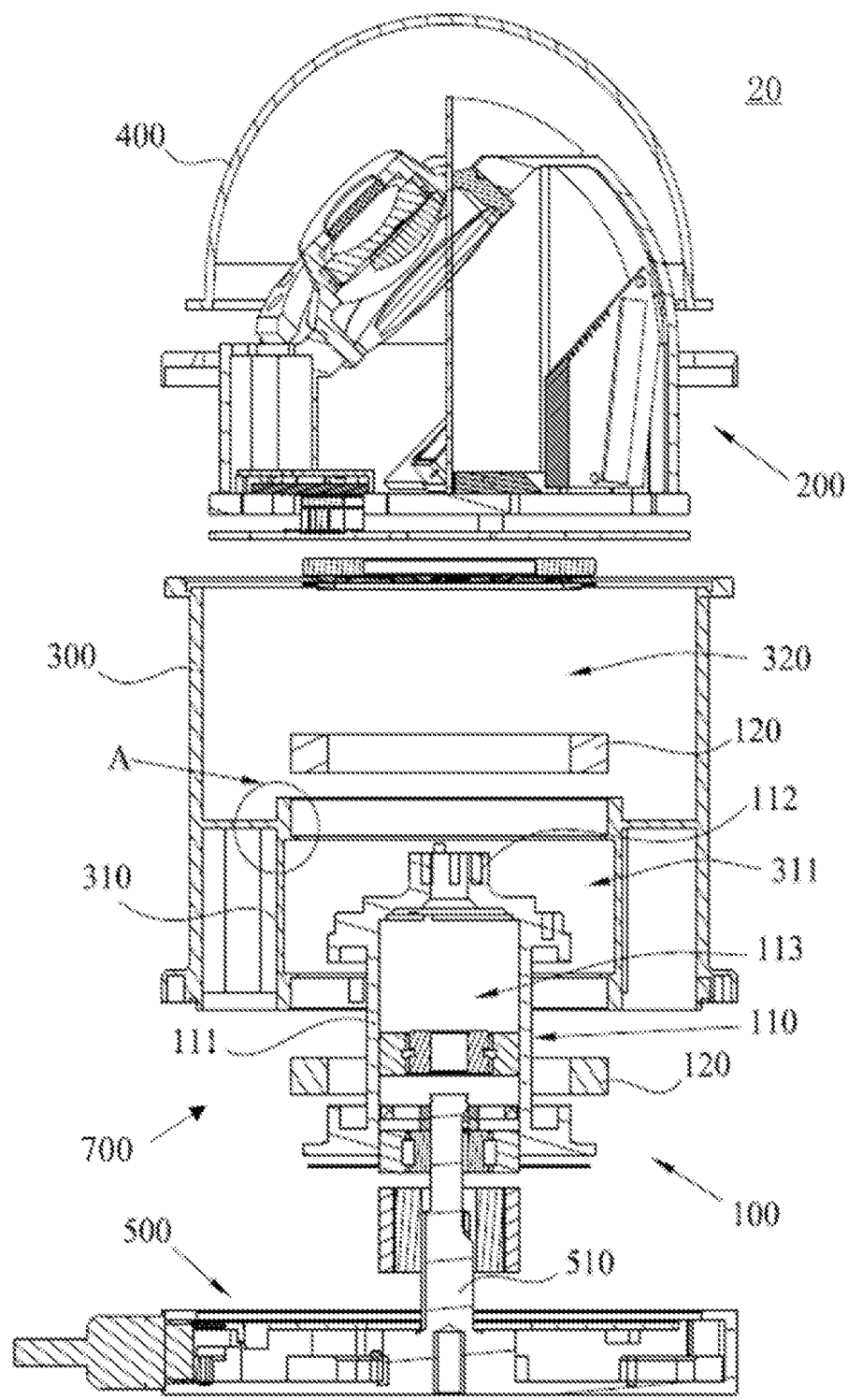
FIG. 14 is an exploded schematic diagram of a section view of another type of LiDAR provided in accordance with an embodiment of the present application.
Figure 15:
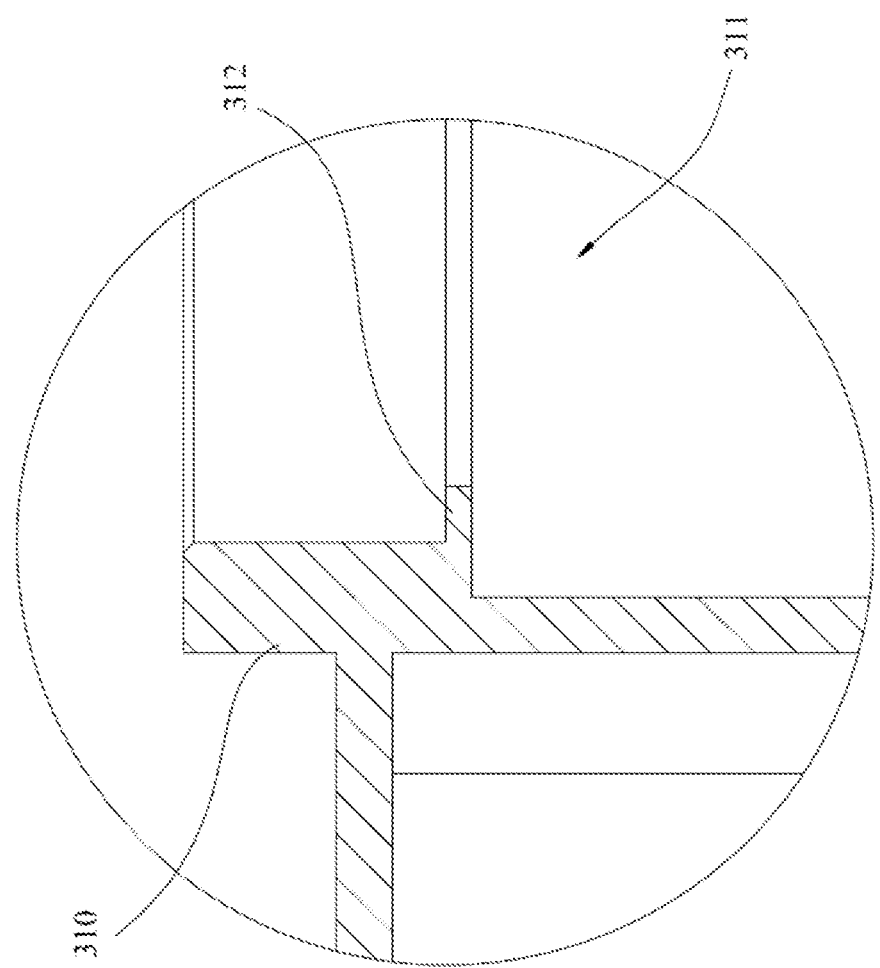
FIG. 15 is a partial enlarged diagram of A in FIG. 14.

As shown in FIGS. 12 and 13, in order to facilitate positioning of the bearing 120, a stepped structure may be disposed in the accommodating chamber 311 of the fixing structure 310, and the bearing 120 is fixed to the stepped structure. The stepped structure can provide the outer ring of the bearing 120 with a vertically upward bearing force. In addition, in order to make positioning of the rotating body 110 more stable, two bearings 120 may be disposed in the accommodating chamber 311 of the fixing structure 310, and the two bearings 120 are respectively sleeved over upper and lower ends of the outer peripheral wall of the driving body 111.

The shaft body 112 of the rotating body 110 may extend upward from the first housing 300, so that the shaft body 112 is detachably connected to the laser transceiver system 200. However, in order to improve reliability of the connection between the laser transceiver system 200 and the rotating body 110, in some embodiments, the lower end of the laser transceiver system 200 may be located in the internal chamber 320 and detachably connected to the shaft body 112 of the rotating body 110. The other end of the laser transceiver system 200 protrudes upward from the internal chamber 320 through the rotating port 321. The foregoing structure makes the connection between the laser transceiver system 200 and the shaft body 112 of the rotating body 110 covered by the first housing 300, so that the connection between the two is not susceptible to failures caused by foreign matters.

When the lower end of the laser transceiver system 200 extends into the accommodating chamber 311 of the first housing 300, a transmitting lens 220 for emitting the emitted laser and a receiving lens 230 for receiving the reflected laser in the laser transceiver system 200 are both located outside the internal chamber 320, that is, the transmitting lens 220 and the receiving lens 230 are respectively disposed at the upper end of the laser transceiver system 200 that protrudes from the internal chamber 320, to facilitate laser transmission and reception.

The laser transceiver system 200 may further include a supporting plate 210. The supporting plate 210 is horizontally disposed in the internal chamber 320 of the first housing 300. In addition, one side of the supporting plate 210 faces the fixed port 322, and the other side thereof faces the rotating port 321. The supporting plate 210 is disposed at a bottom end of the laser transceiver system 200. The supporting plate 210 is detachably connected to the rotating system 100, and is specifically connected to the shaft body 112 of the rotating system 100 by threaded fasteners. Both the transmitting device and the receiving device of the laser transceiver system 200 are disposed on an upper surface of the supporting plate 210.

In order to protect internal components of the laser transceiver system 200, the laser transceiver system 200 may further include an outer housing 240. The outer housing 240 may be the inner housing 240 in the foregoing baffle fixing structure 600. The outer housing 240 may be a protective housing located outside the internal components of the laser transceiver system 200. The supporting plate 210 is connected to a lower end of the outer housing 240 and covers the lower end of the outer housing 240. The transmitting device and the receiving device of the laser transceiver system 200 are both disposed in the space enclosed by the outer housing 240 and the supporting plate 210. Because the space enclosed by the outer housing 240 and the supporting plate 210 does not include other components that block the laser path, the laser generated by the laser transmitting device can be emitted out of the outer housing 240 along a straight line, and the laser entering the outer housing 240 can also follow a straight line to arrive at the receiving device.

As shown in FIGS. 11 to 16, the LiDAR 20 may further include a second housing 400. The second housing 400 may be the outer housing 400 in the foregoing baffle fixing structure 600. The second housing 400 is connected to one end of the first housing 300 near the laser transceiver system 200. The laser transceiver system 200 is completely located in a cavity enclosed by the second housing 400 and the first housing 300. Specifically, the second housing 400 may be a spherical housing, and may also be made of a transparent material, so that the emitted laser generated by the transmitting device can travel outside the second housing 400, and that the reflected laser received by the receiving device can enter the second housing 400.

The emitted laser may pass through the transmitting lens 220 to travel outside the outer housing 240 and further pass through the second housing 400 to travel outside the second housing 400. The reflected laser passes through the second housing 400 to enter the second housing 400 and further passes through the reflecting lens 230 (receiving lens 230) to enter the outer housing 240.

In some embodiments, the laser transceiver system 200 may further include a circuit board 250. The circuit board 250 is configured to process and transmit laser signals. The circuit board 250 is fixed to the supporting plate 210. Specifically, the circuit board 250 may be disposed above the supporting plate 210 so that the inner housing 240 of the laser transceiver system 200 can protect the circuit board 25. Alternatively, the circuit board 250 may be disposed below the supporting plate 210 to make full use of the space below the supporting plate 210. In order to increase an area of the circuit board 250, a hole may be provided in the circuit board 250 to allow the shaft body 112 of the rotating system 100 to pass through the hole of the circuit board 250. In this way, the circuit board 250 may completely cover a lower surface of the supporting plate 210.

The LiDAR 20 may further include a magnetic ring assembly. The magnetic ring assembly may include an inner magnetic ring 151 and an outer magnetic ring 152 arranged around the inner magnetic ring 151. The inner magnetic ring 151 may be sleeved over the positioning column 510, and the outer magnetic ring 152 is fixed in a position of the inner peripheral wall of the rotating body 110. When the rotating body 110 rotates, the outer magnetic ring 152 rotates relative to the inner magnetic ring 151. The outer magnetic ring 152 is electrically connected to the circuit board 250 of the laser transceiver system 200, to transmit signals to the outer magnetic ring 152. The outer magnetic ring 152 then transmits the received signals to the inner magnetic ring 151, so that the signals of the laser transceiver system 200 can be smoothly transmitted to the outside of the LiDAR 20.

It may be understood that for the laser transceiver system 200, the laser transceiver system 200 includes the transmitting device and the receiving device, where the transmitting device includes a laser transmitting assembly and the transmitting lens, and the receiving device includes the receiving lens and a receiving assembly. A laser signal transmitted by the laser transmitting assembly first enters the transmitting lens through the space enclosed by the outer housing 240 and the supporting plate 210, undergoes shaping by the transmitting lens, then enters the space enclosed by the second housing 400 and the outer housing 240, and finally travels outside the second housing 400 to hit a target object. Therefore, for the laser transceiver system 200, from a perspective of a propagation path of the laser signal, the laser signal first passes through the space defined by the outer housing 240, and then passes through the second housing 400 to hit the target object. Therefore, in the following embodiment of the laser transceiver system, the second housing 400 is also referred to as the outer housing 400, and the outer housing 240 is also referred to as the inner housing 240.

In some embodiments, the LiDAR 20 may further include the foregoing baffle fixing structure 600. Both the transmitting device and the receiving device of the laser transceiver system 200 are disposed in an accommodating chamber 242 of an inner housing 240 of the baffle fixing structure 600. The emitted laser generated by the transmitting device passes through the inner housing 240 to travel outside the accommodating chamber 242, and the reflected laser passes through the inner housing 240 to enter the accommodating chamber 242.

The outer housing 400 is sleeved over the inner housing 240 and spaced apart from the inner housing 240. The outer housing 400 is configured to protect the inner housing 240 or other components of the LiDAR 20. When the transmitting device and the receiving device need to realize the function of rotation in the outer housing 400, a gap needs to be reserved between the outer housing 400 and the inner housing 240, and the gap is used to prevent position interference between the inner housing 240 and the outer housing 400 when the inner housing 240 rotates.

A first isolation portion 671 of a baffle 670 is disposed in the inner housing 240 and is configured to isolate the transmitting device from the receiving device. The first isolation portion 671 of the baffle 670 may divide the accommodating chamber 242 into two mutually isolated working chambers. The transmitting device and the receiving device are respectively arranged in the two working chambers. Therefore, the first isolation portion 671 of the baffle 670 may be configured to isolate the emitted laser from the incident light in the inner housing 240. A second isolation portion 672 of the baffle 670 extends along an edge of the first isolation portion 671 to the space between the inner housing 240 and the outer housing 400, and is configured to isolate the emitted laser from the reflected laser between the outer housing 400 and the inner housing 240.

The transmitting lens 220 and the reflecting lens 230 (receiving lens 230) are both disposed at a working port 248 of the inner housing 240. After the baffle 670 passes through an isolation slit 244, the space between a recessed portion 246 of the inner housing 240 and the outer housing 400 is separated into two relatively independent parts to avoid mutual interference between the emitted laser and the reflected laser. The transmitting lens 220 and the reflecting lens 230 (receiving lens 230) are arranged on two opposite sides of the baffle 670 in a one-to-one correspondence. The transmitting lens 220 is disposed in one part of the working port 248, and the reflecting lens 230 (receiving lens 230) is disposed in the other part. In this case, the transmitting lens 220 and the reflecting lens 230 (receiving lens 230) are respectively attached to two opposite surfaces of the baffle 670, so that the laser passing through the transmitting lens 220 and the laser passing through the reflecting lens 230 (receiving lens 230) are unlikely to interfere with each other. When the working port 248 is configured based on the foregoing structure, the transmitting lens 220, the baffle 670, and the reflecting lens 230 (receiving lens 230) collectively fill the working port 248.

In some embodiments, the LiDAR 20 may further include the foregoing bearing mounting structure 700.

A driving body 111 of the bearing mounting structure 700 may be connected to the driving motor 140 of the LiDAR 20 and configured to obtain a driving force of the driving motor. Specifically, the driving body 111 may define a rotating cavity 113. The driving motor 140 may be located in the rotating cavity 113 defined by the driving body 111. The positioning column 510 extends into the rotating cavity 113 from the bottom up. After the positioning column 510 extends into the rotating cavity 113, the positioning column 510 is located at the center of the rotating cavity 113. The stator 141 of the driving motor 140 is sleeved over the positioning column 510. The rotor 142 of the driving motor 140 is connected to the inner peripheral wall of the rotating cavity 113. When the driving motor 140 works, the rotor 142 rotates around the stator 141, such that the rotating body 110 is driven by the rotor 142 to rotate around the positioning column 510 of the base 500.

The shaft body 112 is connected to an end of the driving body 111, and an end of the shaft body 112 away from the driving body 111 is detachably connected to the laser transceiver system 200 and configured to transmit a torque to the laser transceiver system 200.

One end of the first housing 300 away from the shaft body 112 may be detachably connected to the base 500. Specifically, the base 500 may be connected to the first housing 300 by using threaded fasteners. The positioning column 510 extends toward the shaft body 112 from the end of the first housing 300 that is away from the shaft body 112. The base 500 may cover a port of the first housing 300 away from the shaft body 112, and the base 500 may also be used to carry the first housing 300. That is, the base 500 provides the first housing 300 with a vertically upward bearing force. In another embodiment, alternatively, the first housing 300 may carry the base 500. That is, the base 500 is connected to the port of the first housing 300 away from the shaft body 112 and then suspended, the bearing force of the base 500 is provided by the threaded connection between the base 500 and the first housing 300, and the overall bearing force of the LiDAR 20 is provided by the first housing 300.

It should be noted that the rotating system 100 may also include the foregoing angular displacement measurement device 800, configured to measure a rotation angle of the laser transceiver system 200 relative to the base 500. As described above, the angular displacement measurement device 800 may include a light emitting part 810 and a reflecting part 820. The angular displacement measurement device 800 may be mounted in any position of the LiDAR. For example, the angular displacement measurement device 800 may be mounted between the rotating system 100 and the laser transceiver system 200, or may be mounted between the base 500 and the rotating body 110.

When the angular displacement measurement device 800 is mounted between the rotating system 100 and the laser transceiver system 200, the light emitting part 810 may be indirectly connected to the rotating system 100, and the reflecting part 820 may be directly or indirectly connected to an end of the laser transceiver system 200 near the rotating system 100. Specifically, the light emitting part 810 may be directly or indirectly connected to the rotating port 321 at one end of the first housing 300 near the laser transceiver system 200. Because the first housing 300 is fixedly connected to the base 500, this is equivalent to indirectly connecting the light emitting part 810 to the rotating system 100 by using the first housing 300, and specifically equivalent to indirectly connecting the light emitting part 810 to the base 500 by using the first housing 300. The reflecting part 820 may be directly or indirectly connected to the lower surface of the supporting plate 210 of the laser transceiver system 200 near the rotating system 100. Because the supporting plate 210 is fixedly connected to the shaft body 112 of the rotating body 110, this is equivalent to indirectly connecting the reflecting part 820 to the rotating body 110 by using the supporting plate 210. In this case, a function of the supporting plate 210 is consistent with a function of the foregoing rotating body 11. In this case, the lower surface (that is, the end of the laser transceiver system 200 near the rotating system 100) of the supporting plate 210 near the rotating system 100 is an end wall 15 of the rotating body 11. When the rotating system 100 drives the laser transceiver system 200 to rotate, the supporting plate 210 drives the reflecting part 820 to rotate relative to the first housing 300 and the light emitting part 810, thereby measuring the rotation angle of the laser transceiver system 200 relative to the base 500.

When the angular displacement measurement device 800 is mounted between the base 500 and the rotating body 110, the light emitting part may be directly connected to the rotating system 100, and the reflecting part 820 may be directly connected to one end of the rotating body 110 near the base 500. Specifically, the light emitting part 810 may be directly connected to an end of the base 500 of the rotating system 100 near the first housing 300. Because the first housing 300 is fixedly connected to the base 500, this is equivalent to indirectly fixedly connecting the light emitting part 810 to the first housing 300. Because the rotating body 110 is connected to the laser transceiver system 200, this is equivalent to indirectly connecting the reflecting part 820 to the laser transceiver system 200. In this case, one end of the rotating body 110 near the base 500 is the end wall 15 of the rotating body 11. When the rotating system 100 drives the laser transceiver system 200 to rotate, the rotating body 110 drives the reflecting part 820 to rotate relative to the base 500 and the light emitting part 810, thereby measuring the rotation angle of the laser transceiver system 200 relative to the base 500.

In summary, after reading this detailed disclosure, those skilled in the art can understand that the foregoing detailed disclosure may be presented by way of example only, and may not be limiting. Although not explicitly stated herein, those skilled in the art will understand that the present application is intended to cover various changes, improvements and modifications of the embodiments. These changes, modifications, and improvements are intended to be made by the present disclosure and are within the spirit and scope of the exemplary embodiments of the present disclosure.

In addition, some of the terms in this application have been used to describe embodiments of the present disclosure. For example, "one embodiment," "an embodiment," and/or "some embodiments" means that a particular feature, structure or characteristic described in connection with the embodiment may be included in at least one embodiment of the present disclosure. Therefore, it should be emphasized and understood that in various parts of the present disclosure, two or more references to "an embodiment," "one embodiment," or "an alternate embodiment" are not necessarily referring to the same embodiment. Furthermore, the particular features, structures, or characteristics may be combined as appropriate in one or more embodiments of the present disclosure.

It should be understood that in the description of the embodiments of the present disclosure, to assist in understanding a feature and for the purpose of simplifying the present disclosure, sometimes various features may be combined in a single embodiment, or drawings, description thereof. Alternatively, various features may be described in different embodiments of the present application. However, this is not to say that a combination of these features is necessary, and it is entirely possible for those skilled in the art to understand that a part of these features may be extracted as a separate embodiment. That is to say, the embodiments in the present application can also be understood as the integration of a plurality of secondary embodiments. It is also true that the content of each of the sub-embodiments may be less than all of the features of a single previously disclosed embodiment.

In some embodiments, numbers expressing quantities or properties used to describe or define the embodiments of the present application should be understood as being modified by the terms "about," "approximate," or "substantially" in some instances. For example, "about," "approximately," or "substantially" may mean a ±20% change in the described value or less, unless otherwise stated. Accordingly, in some embodiments, the numerical parameters set forth in the written description and the appended claims are approximations, which may vary depending upon the desired properties sought to be obtained in a particular embodiment. In some embodiments, numerical parameters should be interpreted in accordance with the value of the parameters and by applying ordinary rounding techniques. Although a number of embodiments of the present application provide a broad range of numerical ranges and parameters that are approximations, the values in the specific examples are as accurate as possible.

Each of the patents, patent applications, patent application publications, and other materials, such as articles, books, instructions, publications, documents, products, etc., cited herein are hereby incorporated by reference, which are applicable to all contents used for all purposes, except for any history of prosecution documents associated therewith, any identical, or any identical prosecution document history, which may be inconsistent or conflicting with this document, or any such subject matter that may have a restrictive effect on the broadest scope of the claims associated with this document now or later. For example, if there is any inconsistent or conflicting in descriptions, definitions, and/or use of a term associated with this document and descriptions, definitions, and/or use of the term associated with any materials, the term in this document shall prevail.

Finally, it should be understood that the embodiments of the application disclosed herein are merely described to illustrate the principles of the embodiments of the application. Other modified embodiments are also within the scope of this application. Therefore, the embodiments disclosed herein are by way of example only and not limitations. Those skilled in the art can adopt alternative configurations to implement the invention in this application in accordance with the embodiments of the present application. Therefore, the embodiments of the present application are not limited to those embodiments that have been precisely described in this disclosure.

What is claimed is:

1. A baffle fixing structure for a LiDAR, the LiDAR including a transmitting device and a receiving device, the transmitting device being configured to emit an emitted laser, and the receiving device being configured to receive a reflected laser, the reflected laser being a portion of the emitted laser that is reflected back by an object in a detection area, the baffle fixing structure comprising:

an inner housing including a first housing part and a second housing part, wherein the second housing part includes a first part, a second part and a third part; the first part is spaced apart from the first housing part; the second part and the third part are connected between the first part and the first housing part and together form an accommodating chamber; both of the first part and the second part are flat; the second part is skewed relative to the first part; and the second part is provided with a working port and an isolation slit communicating with the working port;

an outer housing, sleeved outside the inner housing and spaced apart from the inner housing; and a baffle including a second isolation portion and a first isolation portion, wherein the second isolation portion is arranged in the accommodating chamber and divides the accommodating chamber into two mutually isolated working chambers; the transmitting device and the receiving device are respectively arranged in the two working chambers; a transmitting lens of the transmitting device and a reflecting lens of the receiving device both extend out of the working port; the second isolation portion isolates the transmitting device from the receiving device; one end of the first isolation portion is connected to the second isolation portion; and the other end of the first isolation portion passes through the isolation slit and is located between the inner housing and the outer housing, and is configured to isolate the emitted laser and the reflected laser light between the outer housing and the inner housing.

2. The baffle fixing structure of claim 1, wherein:
the second isolation portion includes a sealed edge located between the outer housing and the inner housing and facing the outer housing; the sealed edge is spaced apart from an inner side wall of the outer housing; and a distance between the sealed edge and the inner side wall of the outer housing is equal everywhere.

3. The baffle fixing structure according to claim 2, wherein:
the outer housing is a hemispherical housing; and the sealed edge of the baffle has an arc shape.

4. The baffle fixing structure according to claim 1, wherein:
the transmitting lens and the reflecting lens are respectively attached to two opposite surfaces of the baffle.

5. A LiDAR, comprising:
a baffle fixing structure according to claim 1; and
a laser transceiver system, including the transmitting device and the receiving device.

6. The LiDAR of claim 5, further comprising:
a rotation system configured to drive the laser transceiver system to rotate within the outer housing.

7. The LiDAR of claim 6, wherein:
the laser transceiver system is disposed above the rotation system; and the laser transceiver system is detachably connected to the rotation system.

* * * * *